US010046820B2

(12) United States Patent
Jenett et al.

(10) Patent No.: US 10,046,820 B2
(45) Date of Patent: Aug. 14, 2018

(54) BIPEDAL ISOTROPIC LATTICE LOCOMOTING EXPLORER: ROBOTIC PLATFORM FOR LOCOMOTION AND MANIPULATION OF DISCRETE LATTICE STRUCTURES AND LIGHTWEIGHT SPACE STRUCTURES

(71) Applicants: Massachusetts Institute of Technology, Cambridge, MA (US); The United States of America As Represented By The Administrator Of The National Aeronautics And Space Administration, Washington, DC (US)

(72) Inventors: Benjamin Jenett, Cambridge, MA (US); Kenneth Cheung, Emerald Hills, CA (US); Neil Gershenfeld, Cambridge, MA (US)

(73) Assignee: Massachusetts Institute for Technology, Cambridge, MA (US)

( * ) Notice: Subject to any disclaimer, the term of this patent is extended or adjusted under 35 U.S.C. 154(b) by 0 days.

(21) Appl. No.: 15/633,155

(22) Filed: Jun. 26, 2017

(65) Prior Publication Data
US 2017/0368679 A1   Dec. 28, 2017

Related U.S. Application Data

(63) Continuation of application No. PCT/US2017/039246, filed on Jun. 26, 2017.
(Continued)

(51) Int. Cl.
*B25J 9/00* (2006.01)
*B62D 57/02* (2006.01)
(Continued)

(52) U.S. Cl.
CPC .............. *B62D 57/02* (2013.01); *B25J 9/009* (2013.01); *B25J 9/0009* (2013.01); *B25J 9/0096* (2013.01);
(Continued)

(58) Field of Classification Search
CPC ..... B62D 57/02; B64G 4/00; B64G 2004/005
See application file for complete search history.

(56) References Cited

U.S. PATENT DOCUMENTS

| 4,738,583 A | 4/1988 | Macconochie et al. |
| 5,145,130 A | 9/1992 | Purves |

(Continued)

OTHER PUBLICATIONS

Terada and Murata, "Automatic assembly syst. for a large-scale modular structure-hardware design of module and assembler robot," 2004 IEEE/RSJ Int. Conf. Intell. Robot. 2004.
(Continued)

*Primary Examiner* — Kevin Hurley
(74) *Attorney, Agent, or Firm* — Robert Greenspoon; Flachsbart & Greenspoon LLC

(57) ABSTRACT

A robotic platform for traversing and manipulating a modular 3D lattice structure is described. The robot is designed specifically for its tasks within a structured environment, and is simplified in terms of its numbers of degrees of freedom (DOF). This allows for simpler controls and a reduction of mass and cost. Designing the robot relative to the environment in which it operates results in a specific type of robot called a "relative robot". Depending on the task and environment, there can be a number of relative robots. This invention describes a bipedal robot which can locomote across a periodic lattice structure made of building block parts. The robot is able to handle, manipulate, and transport these blocks when there is more than one robot. Based on a general inchworm design, the robot has added functionality
(Continued)

while retaining minimal complexity, and can perform numerous maneuvers for increased speed, reach, and placement.

21 Claims, 19 Drawing Sheets

Related U.S. Application Data

(60) Provisional application No. 62/355,008, filed on Jun. 27, 2016, provisional application No. 62/384,302, filed on Sep. 7, 2016.

(51) Int. Cl.
| | |
|---|---|
| *B25J 9/04* | (2006.01) |
| *B25J 9/16* | (2006.01) |
| *B25J 13/00* | (2006.01) |
| *B64G 4/00* | (2006.01) |
| B25J 18/00 | (2006.01) |
| B25J 17/02 | (2006.01) |

(52) U.S. Cl.
CPC ............... *B25J 9/04* (2013.01); *B25J 9/1682* (2013.01); *B25J 13/006* (2013.01); *B64G 4/00* (2013.01); *B25J 17/02* (2013.01); *B25J 18/00* (2013.01); *B64G 2004/005* (2013.01); *G05B 2219/45083* (2013.01)

(56) References Cited

U.S. PATENT DOCUMENTS

| | | | |
|---|---|---|---|
| 7,848,838 | B2 | 12/2010 | Gershenfeld et al. |
| 2009/0274865 | A1 | 11/2009 | Wadley et al. |
| 2011/0180333 | A1 | 7/2011 | Niederberger |
| 2012/0094060 | A1 | 4/2012 | Gershenfeld et al. |
| 2014/0300211 | A1 | 10/2014 | Peek et al. |
| 2018/0001471 | A1* | 1/2018 | Kanazawa ............ B25J 9/1664 |

OTHER PUBLICATIONS

K. C. Cheung and N. Gershenfeld, "Reversibly assembled cellular composite materials.," Science, vol. 341, No. 6151, pp. 1219-1221, 2013.
M. M. Mikulas, T. J. Collins, W. Doggett, J. Dorsey, and J. Watson, "Truss performance and packaging metrics," in AIP Conference Proceedings, 2006, vol. 813, pp. 1000-1009.
B. Jenett et al., "Meso-scale digital materials: modular, reconfigurable, lattice-based structures," in Proceedings of the 2016 Manufacturing Science and Eng. Conference, 2016.
M. Carney and B. Jenett, "Relative Robots: Scaling Automated Assembly of Discrete Cellular Lattices," in Proceedings of the 2016 Manufacturing Science and Eng. Conf., 2016.
W. R. Doggett, "A Guidance Scheme for Automated Tetrahedral Truss Structure Assembly Based on Machine Vision," 1996.
K. D. Kotay and D. L. Rus, "Navigating 3D steel web structures with an inchworm robot," Proc. IEEE/RSJ Int. Conf. Intell. Robot. Syst. IROS '96, vol. 1, pp. 368-375, 1996.
S. M. Felton et al., "Robot self-assembly by folding: A printed inchworm robot," in Proceedings—IEEE International Conference on RRobotics and Automation, 2013, pp. 277-282.
C. Balaguer et al., "A climbing autonomous robot for inspection applications in 3d complex environments," Robotica, vol. 18, No. 3, pp. 287-297, 2000.
R. L. Tummala, R. Mukherjee, N. Xi, D. Aslam, H. Dulimarta, J. Xiao, M. Minor, and G. Dangi, "Climbing the walls," IEEE Robot. Autom. Mag., vol. 9, No. 4, pp. 10-19, 2002.
International Search Report, Written Opinion of the ISA, and Examiner's Search Strategy/Results for PCT/US17/39246, dated Sep. 6, 2017.
M. Mikulas and J. T. Dorsey, "An integrated in-space construction facility for the 21st century," NASA Tech. Memo. 101515, 1988.
M. Mikulas and H. Bush, "Design, Construction, and Utilization of a Space Station Assembled from 5-Meter Erectable Struts," NASA Struct. Interact. Technol., 1987.
W. R. Doggett, "Robotic Assembly of Truss Structures for Space Systems and Future Research Plans," in IEEE Aerospace Conference Proceedings, 2002.
B. Chu, K. Jung, C. S. Han, and D. Hong, "A survey of climbing robots: Locomotion and adhesion," Int. J. Precis. Eng. Manuf., vol. 11, No. 4, pp. 633-647, 2010.
P. J. Staritz et al., "Skyworker: A robot for assembly, insp. and maint. of large scale orbital facilities," in Proceedings—IEEE Intl. Conf. on Robotics and Automation, 2001.
F. Nigl et al., "Structure-reconfiguring robots: Autonomous truss reconfiguration and manipulation," IEEE Robot. Autom. Mag., vol. 20, No. 3, pp. 60-71, 2013.
Y. Yoon and D. Rus, "Shady3D: A Robot that Climbs 3D Trusses," in IEEE International Conference on Robotics and Automation, 2007.
W. Whittaker et al., "Robotics for assembly, inspection, and maintenance of space macrofacilities," Am. Inst. Aeronaut. Astronaut., 2000.
M. D. Rhodes, R. W. Will, and C. Quach, "Baseline Tests of an Autonomous Telerobotic System for Assembly of Space Truss Structures," Langley, 1994.
M. Lake, W. Heard, J. Watson, and T. J. Collins, "Evaluation of Hardware and Procedures for Astronaut Assembly and Repair of Large Precision Reflectors," Langley, 2000.
T. Murphey and J. Hinkle, "Some performance trends in hierarchical truss structures," in 44th AIAA/ASME/ASCE/AHS Structures, Structural Dynamics, and Materials Conf., 2003.

* cited by examiner

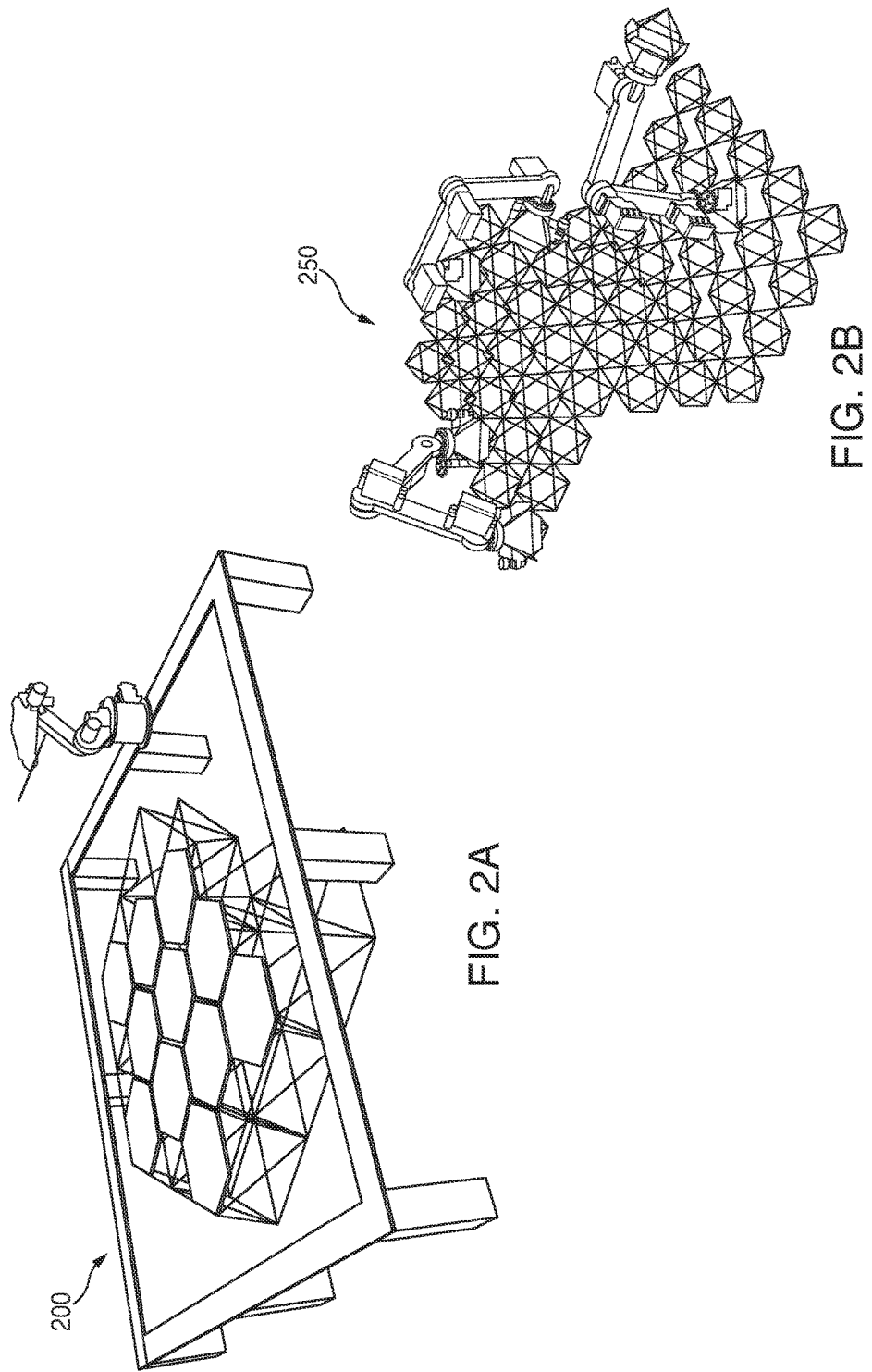

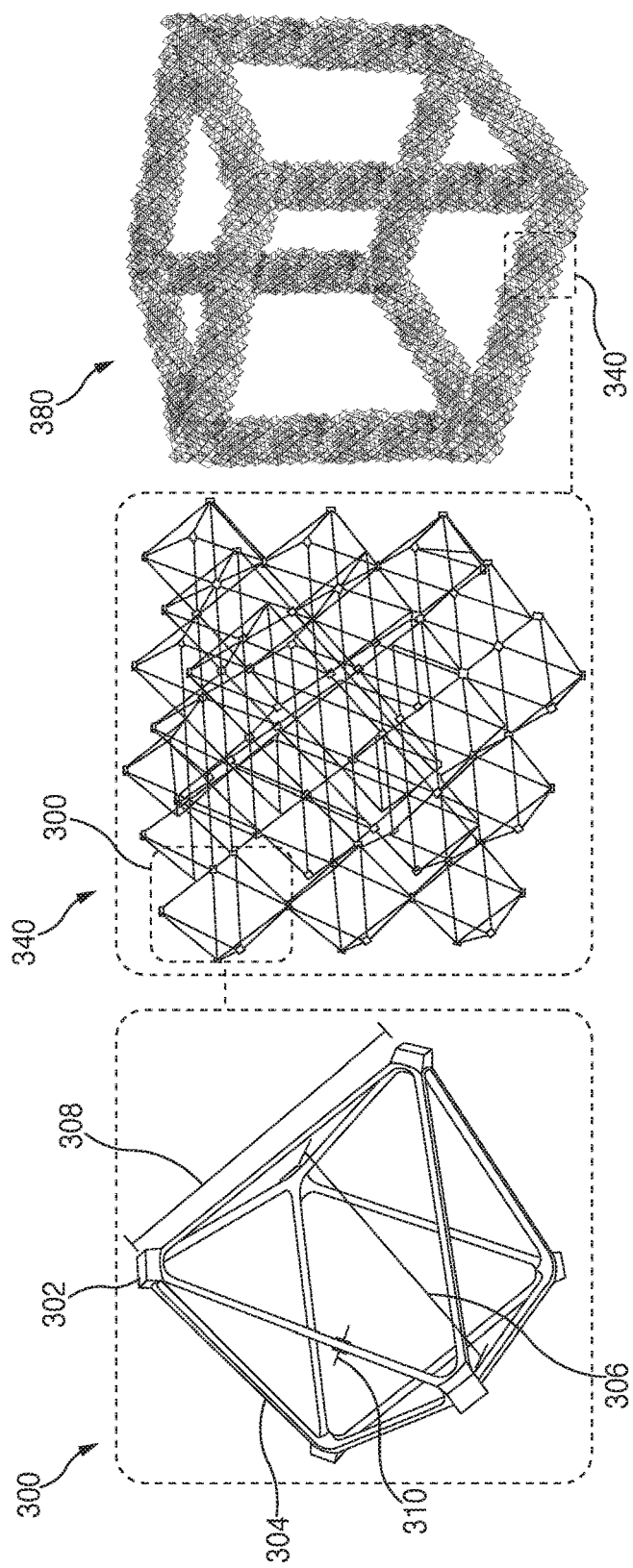

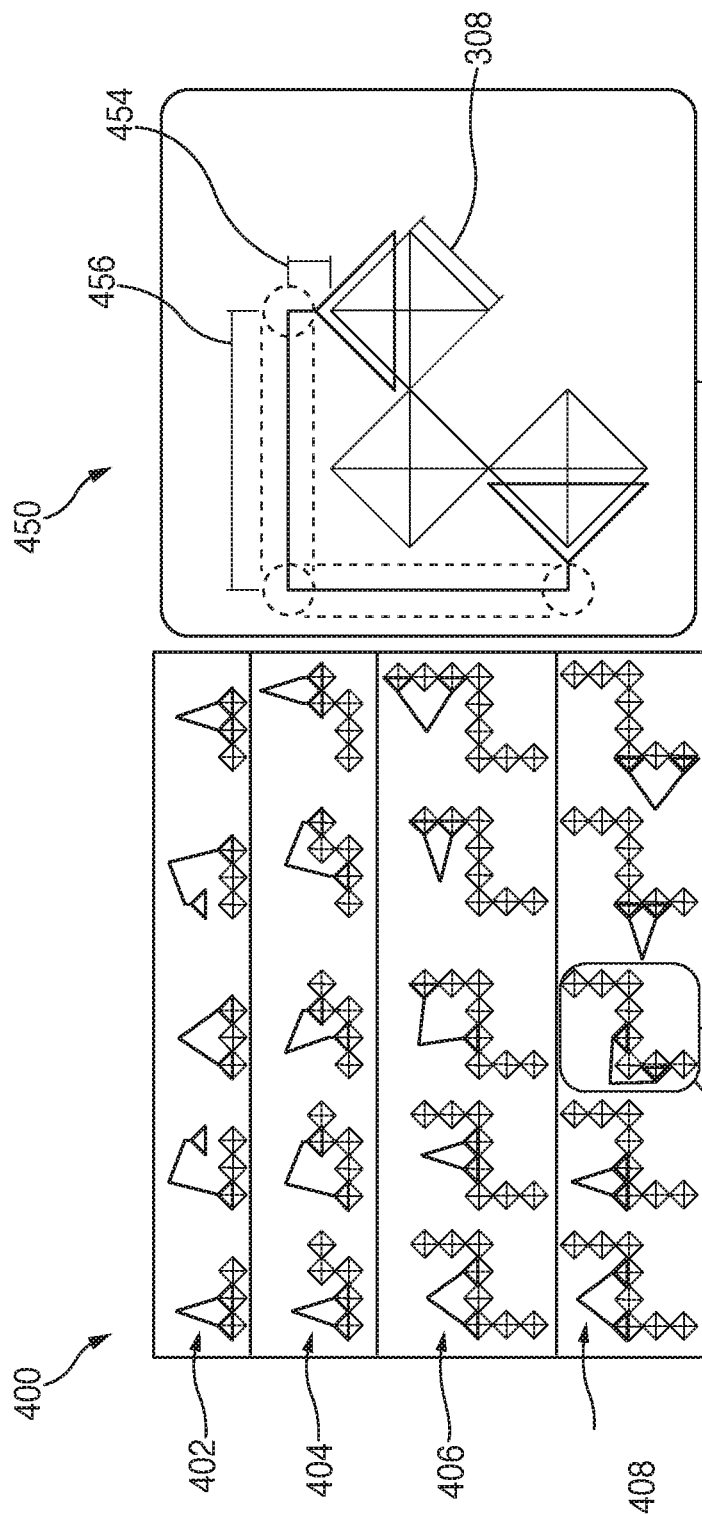

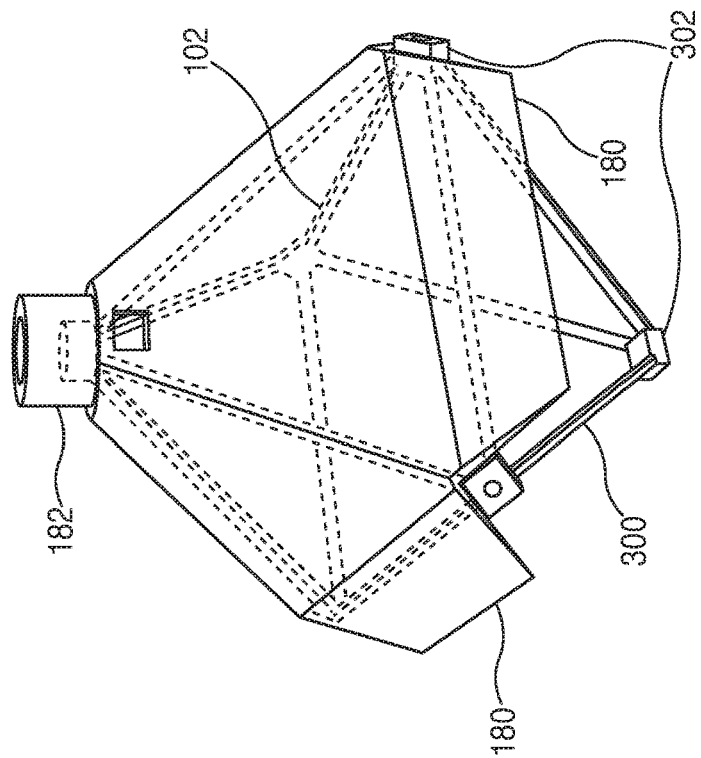
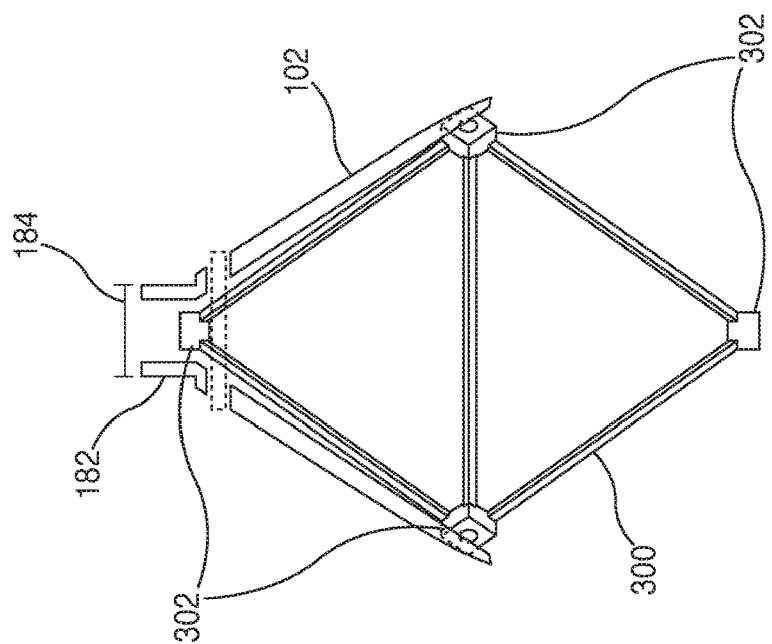
FIG. 9B
FIG. 9A

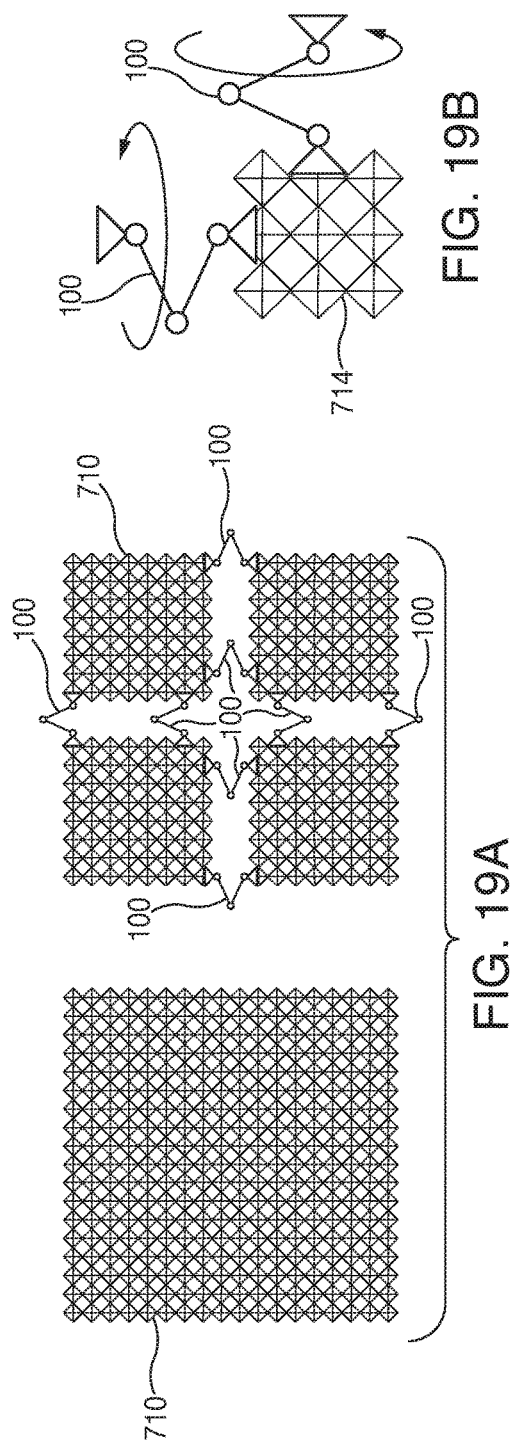
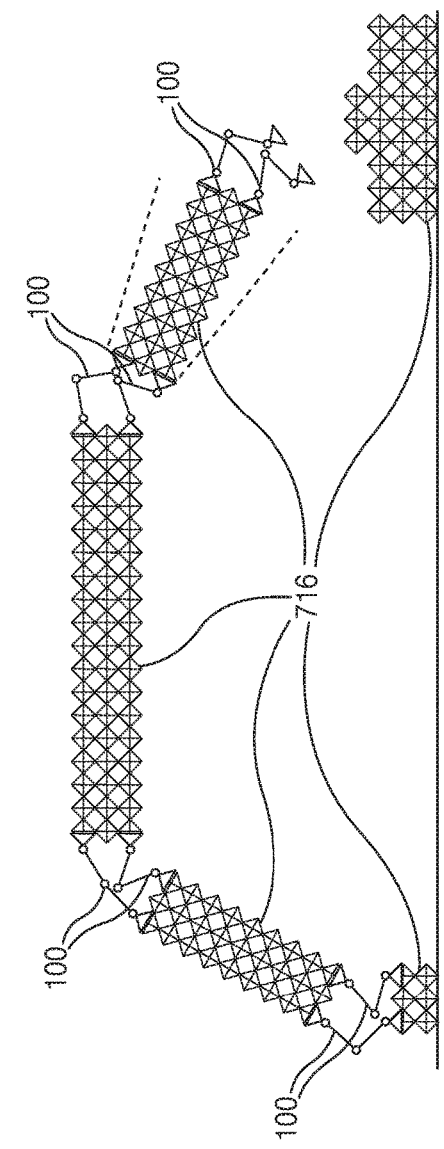
FIG. 19A
FIG. 19B
FIG. 19C

BIPEDAL ISOTROPIC LATTICE LOCOMOTING EXPLORER: ROBOTIC PLATFORM FOR LOCOMOTION AND MANIPULATION OF DISCRETE LATTICE STRUCTURES AND LIGHTWEIGHT SPACE STRUCTURES

This application is a continuation of International Application No. PCT/US17/39246, filed Jun. 26, 2017, and claims the benefit of U.S. Provisional Application No. 62/355,008, filed Jun. 27, 2016, and U.S. Provisional Application No. 62/384,302, filed Sep. 7, 2016, the entire disclosures of which are herein incorporated by reference.

This invention was made with government support under Grant/Contract No. NNX14AG47A awarded by NASA, and Grant/Contract No. NNX14AM40H S01 awarded by NASA. The government has certain rights in the invention.

TECHNICAL FIELD OF THE INVENTION

The present invention relates to robotics, particularly a robot designed to locomote on the outside of a specific lattice structure.

BACKGROUND OF THE INVENTION

The general description of the problem and objective is as follows. Large structures can be assembled from smaller discrete parts. This has several benefits including the mass production of parts, the assembly and disassembly of parts for repair or reconfiguration, and the automation of the assembly with robots. Robotic assembly is an existing technology which typically uses multi degree of freedom (DOF) robots for dexterity and complex maneuvering. One example is industrial robot arms used for car manufacturing. These robots require sophisticated control strategies, and they are typically fitted with varying end effectors for the tasks they perform (e.g., welding, tightening, painting). These robots can be mounted to linear gantries to increase the available build area for a given robot. However, this approach runs into issues for very large or complex structures.

This invention involves several key and unique problem characteristics. Discrete assembly of larger structures affords numerous opportunities to overcome the limitations of traditional robotic assembly approaches. The lattice structure in question is periodic and isotropic, so it provides a structured environment in which the robot operates. This can alleviate requirements for global positioning or vision systems, due to the fact that it only works within the 3D grid. In this sense, the structure is "digital", in that it can be considered as a 1 or a 0—there is either structure or no structure.

There is prior art (i.e., prior techniques, methods, materials, and/or devices), but none that describe a Bipedal Isotropic Lattice Locomoting Explorer as described by the present invention. For example, there are relevant examples of robots that build lattice structures, robots that move in an inch work fashion, and robots that operate and manipulate discrete structures. Disadvantages or limitations of the prior art include: 1) Lattice building robots: the build volume of these gantry based robot platforms limits the scale of the object being built. Also reach is limited by the geometry of the robot arm or gantry system; 2) Inchworm robots: The main difference between the robot described by the present invention and existing bipedal inchworm robots is that it is a relative robot operating within a 3D isotropic lattice. This enables it to perform much more complex maneuvers while also enabling interaction and manipulation with the structure that other robots, attaching with means such as suction cups, would be unable to achieve; 3) Relative structure robots: these are not suitable for space applications due to the density of the structure.

Automated construction of large structures is desirable in numerous fields, such as infrastructure and aerospace [W. Whittaker, C. Urmson, P. Staritz, B. Kennedy, and R. O. Ambrose, "Robotics for assembly, inspection, and maintenance of space macrofacilities," Am. Inst. Aeronaut. Astronaut., 2000]. The construction of large space structures has been a challenge due to the limitations of human-based extravehicular activity (EVA) and robot-based extravehicular robotics (EVR). Both approaches face problems regarding risk, throughput, and reliability [M. D. Rhodes, R. W. Will, and C. Quach, "Baseline Tests of an Autonomous Telerobotic System for Assembly of Space Truss Structures," Langley, 1994] [M. Lake, W. Heard, J. Watson, and T. J. Collins, "Evaluation of Hardware and Procedures for Astronaut Assembly and Repair of Large Precision Reflectors," Langley, 2000]. One approach is the autonomous robotic assembly of structures based on truss elements. This is an approach that has been proposed for decades [M. Mikulas and J. T. Dorsey, "An integrated in-space construction facility for the 21st century," NASA Tech. Memo. 101515, 1988], [M. Mikulas and H. Bush, "Design, Construction, and Utilization of a Space Station Assembled from 5-Meter Erectable Struts," NASA Struct. Interact. Technol., 1987]. The general approach is to use a multi-DOF industrial robotic arm mounted to a carriage which can traverse along an X and Y direction gantry system which encompasses the build area of the structure. This is what was used for a main example of a lattice building robot, the Automated Structures Assembly Laboratory developed at NASA Langley Research Center, which successfully demonstrated the viability of using robotic manipulators to automatically assemble and disassemble large truss structures [W. R. Doggett, "Robotic Assembly of Truss Structures for Space Systems and Future Research Plans," in IEEE Aerospace Conference Proceedings, 2002]. This system successfully demonstrated the viability of using robotic manipulators to automatically assemble and disassemble large truss structures.

The use of robots to assist in the exploration and manipulation of structures has been an active topic of research for decades. Truss climbing robots are a form of climbing robot devoted to the traversal of three-dimensional truss structures [B. Chu, K. Jung, C. S. Han, and D. Hong, "A survey of climbing robots: Locomotion and adhesion," Int. J. Precis. Eng. Manuf., vol. 11, no. 4, pp. 633-647, 2010]. Combined with a node design that can be robotically manipulated, such robots promise to provide an autonomous assembly, inspection, and reconfiguration platform for the creation of complex structures [P. J. Staritz, S. Skaff, C. Urmson, and W. Whittaker, "Skyworker: A robot for assembly, inspection and maintenance of large scale orbital facilities," in Proceedings—IEEE International Conference on Robotics and Automation, 2001, vol. 4, pp. 4180-4185]. Locomotion strategies for previous robots have focused on treating the truss as a collection of struts and nodes [F. Nigl, S. Li, J. E. Blum, and H. Lipson, "Structure-reconfiguring robots: Autonomous truss reconfiguration and manipulation," IEEE Robot. Autom. Mag., vol. 20, no. 3, pp. 60-71, 2013] [Y. Yoon and D. Rus, "Shady3D: A Robot that Climbs 3D Trusses," in IEEE International Conference on Robotics and Automation, 2007]. The resulting robots combine 1-D translation along the length of strut with a method for transferring from one strut to another. This strategy is compatible with trusses that have an irregular geometry, at the cost of robotic complexity; in addition to doubling the translational degrees of freedom, performing a strut transfer also requires additional degrees of freedom, which move the relative position of the two translation mechanisms.

An alternative to the strut and node strategy is an approach called the "Relative Robot". Relative robots, or robots which locomote and operate within a structured environment, are a new topic for research. Instead of strut-node networks, Relative Robots traverse a periodic structure, which allows translation with fewer degrees of freedom and enables increased reliability through fault-tolerant connection mechanisms. Examples include platforms such as the Automatic Modular Assembly System (AMAS) [Y. Terada and S. Murata, "Automatic assembly system for a large-scale modular structure—hardware design of module and assembler robot," 2004 IEEE/RSJ Int. Conf. Intell. Robot. Syst. (IEEE Cat. No. 04CH37566), vol. 3, pp. 2349-2355, 2004], and usually the robot and structure are designed simultaneously as a whole system. Relative structure robots in general, and AMAS in particular, may not be suitable for space applications due to the density of the structure.

Recently, work has shown that modular structures built from lattice building blocks can result in structures with high stiffness to weight ratios [K. C. Cheung and N. Gershenfeld, "Reversibly assembled cellular composite materials.," Science, vol. 341, no. 6151, pp. 1219-21, 2013], making them desirable for space applications [M. M. Mikulas, T. J. Collins, W. Doggett, J. Dorsey, and J. Watson, "Truss performance and packaging metrics," in AIP Conference Proceedings, 2006, vol. 813, pp. 1000-1009]. There are numerous benefits afforded by this approach. One is that the building blocks can be reversibly assembled, disassembled, and reconfigured into other structural configurations [B. Jenett, D. Cellucci, C. Gregg, and K. C. Cheung, "Mesoscale digital materials: modular, reconfigurable, lattice-based structures," in Proceedings of the 2016 Manufacturing Science and Engineering Conference, 2016]. The other is that the periodic lattice provides a structured environment in which a robotic platform can operate. This has potential advantages over traditional robotic construction systems which rely on a gantry-based build envelope [M. Carney and B. Jenett, "Relative Robots: Scaling AUtomated Assembly of Discrete Cellular Lattices," in Proceedings of the 2016 Manufacturing Science and Engineering Conference, 2016]. In addition to being able to build arbitrarily large structures, a relative robot achieves metrology based on discrete lattice locations, rather than relying on global positioning systems or complex vision based systems [W. R. Doggett, "A Guidance Scheme for Automated Tetrahedral Truss Structure Assembly Based on Machine Vision," 1996].

This invention describes a relative robotic platform for this modular lattice system, the Bipedal Isotropic Lattice Locomoting Explorer (BILL-E). Its design is specific to its tasks within the structured environment. This invention describes the lattice structure in which it operates, the functional requirements of its tasks, and how these inform the design of the robot. Further, this invention describes the prototype and investigates its performance analytically and with numerous experiments.

U.S. Pat. No. 7,848,838 to Gershenfeld et al. (U.S. application Ser. No. 11/768,176) describes a digital assembler for creating three-dimensional objects from digital materials made out of discrete components comprises an assembly head, error correction mechanism, parts feeder, and a controller ['838 Abstract]. U.S. Publication No. 20120094060 to Gershenfeld et al. (U.S. application Ser. No. 13/277,103) describes a digital material comprising many discrete units used to fabricate a sparse structure ['060 Abstract]. Neither the '838 patent nor the '060 publication disclose a bipedal isotropic locomoting explorer relative robot as described by this invention.

SUMMARY OF THE INVENTION

A robot platform for locomotion and manipulation of discrete lattice structures is described. The design of the robot is specific to the lattice in which it operates, which allows leveraging a periodic, structured environment to simplify the robot. The robot has the ability to locomote to nearly any point on the exterior of the lattice structure, as well as handling and manipulating parts of the structure. This invention enables the construction of arbitrarily large structures built from discrete parts.

BILL-E stands for Bipedal Isotropic Lattice Locomoting Explorer. BILL-E is a two legged robot that is designed to locomote on the outside of a specific lattice structure. Because this lattice is periodic and built from modular elements, its design can be simplified to operate within this structured environment. It is designed as a robot which uses the minimum number of degrees of freedom necessary to complete its desired tasks.

The robot consists of two feet, two lower legs, and two upper legs, and has a total of seven motors: two at the feet, two at the lower legs, two at the "knees" (where the lower leg joins the upper leg) and one at the "hip" where the two upper legs come together.

The control hardware for BILL-E acts as the interface between the three Hitec HS7950TH and four Hitec HS5065MG servos that actuate the robot, and the computer that issues the commands. This hardware consists of a Mini Maestro 12, an efficient microcontroller with a native USB interface and internal scripting control, and a 2.4 GHz XBee module implementing the 802.15.4 stack. Powering these servos is an 800 mAh 2S Lithiumpolymer battery capable of 16 A continuous discharge at 7.4 V. Each battery provides 6 Wh of energy and weighs 48.2 g.

Hardware Description

1. Foot: The foot is designed as a hollow tetrahedral with features designed to fit around the boundary geometry of the voxel structure. It then locks onto the voxel with a latch mechanism, which is driven by one of the small servos. This latch passes through a hole near the top of the tetrahedral, under the top of the voxel, and out the other side of the tetrahedra. This prevents the foot from lifting up off the structure. Taper also ensures a tight fit to prevent any loosening of the grip.

2. Lower leg: The foot is attached to the lower leg by a radial bearing. The foot is press fit to the inside race of the bearing, and the lower leg is press fit around the outside onto the outer race of the bearing. This provides a rotational degree of freedom in the Z direction, while providing a translational constraint in X, Y, and Z, and a rotational constraint in X and Y. This rotation is actuated by a pair of spur gears. One gear is built into the lower leg, the other gear is mounted to a small servo. The top of the lower leg consists of a bracket and a shaft which is pressfit into the inside of a bearing. The outside of the bearing is pressfit into the end of the upper leg portion.

3. Upper Leg: there are two types of upper legs. Each type has a similar interface with the lower leg. A servo motor is mounted so that its output spline radial axis is aligned with bearing interface with the lower leg. The lower leg shaft extends through the bearing and rigidly attaches to the servo spline. This allows a rotational degree of freedom between the upper and lower leg to be controlled by the servo. The upper legs interface at the "hip", where a similar rotational degree of freedom is used between the two upper legs. One leg has a shaft which pressfits into the inside of a bearing. The other leg pressfits around the outside of the bearing, and a servo is mounted to align with the bearing. The servo is rigidly attached to the shaft of the other leg which passes through the bearing.

BILL-E can walk in a straight path by attaching the back foot, reaching out with the front foot, attaching the front foot, detaching the back foot, and stepping forward with the back foot. It can also take larger steps by attaching the front foot, rotating 180 degrees about the front foot, extending the (previously) back foot, and attaching.

Because of its latching grip it can walk up or down vertically on the structure perpendicular to the ground, and on the underside of surfaces parallel to the ground. It can rotate 90 degrees to move from X to Y translation. It can turn inside/outside corners to transition from one surface to a perpendicular surface. With these combined motions, it can access nearly any point on the exterior of a lattice structure.

It can also grip with one foot and use the other foot to grip a single voxel, and extend to place and attach the voxel in a new area of the structure.

BRIEF DESCRIPTION OF THE DRAWINGS

FIG. 2A is a gantry-based robotic arm assembly system.

FIG. 2B is a relative robotic system.

FIG. 3A shows a building block voxel.

FIG. 3B shows a 3×3×3 cube of voxels.

FIG. 3C shows an arbitrary macro geometry made of voxels.

FIG. 4A shows the primitive functional requirements for lattice locomotion.

FIG. 4B is a detail view of a convex corner turn.

FIG. 9A shows a view of the foot geometry designed to fit around an octahedra voxel.

FIG. 9B shows how the foot corner features mate with node geometry of an octahedra voxel.

FIG. 19A shows active damping of a plate structure.

FIG. 19B shows attitude control for a satellite.

FIG. 19C shows actuation of a macro structure.

DETAILED DESCRIPTION OF INVENTION

Methodology

Figure 1:
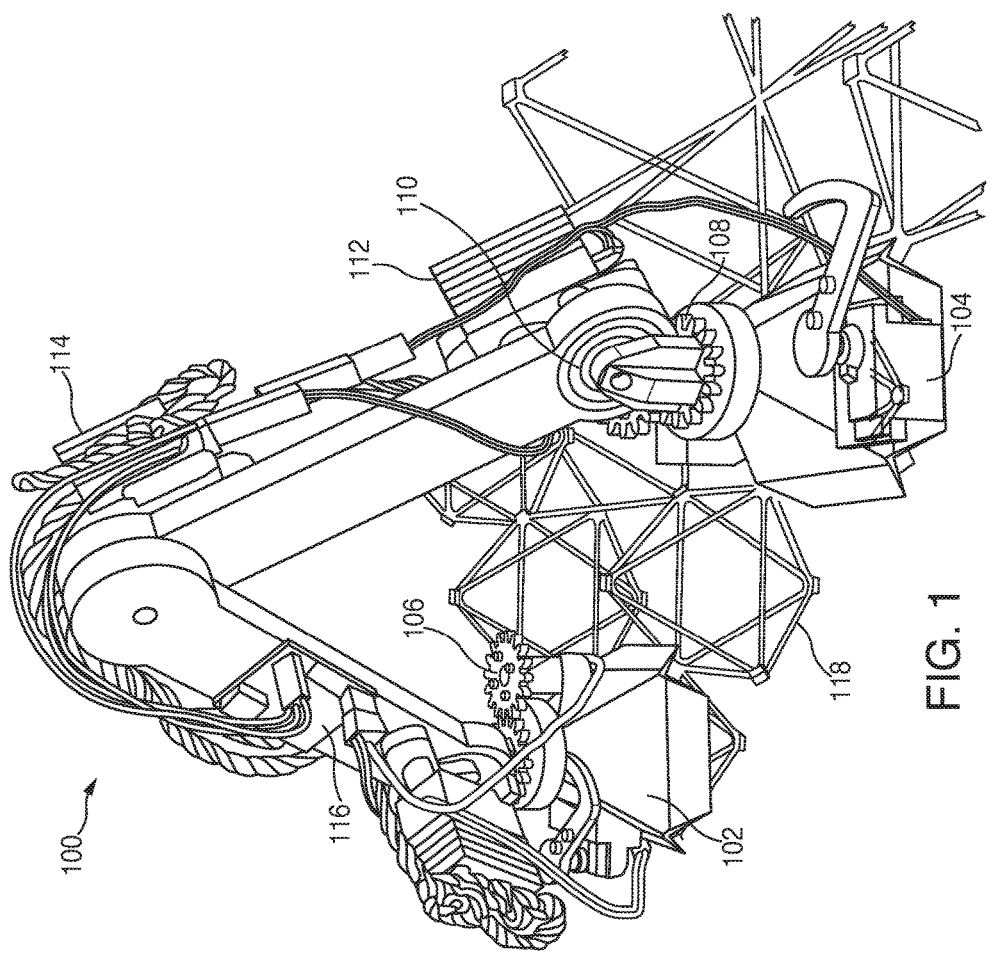
FIG. 1 is an example Bipedal Isotropic Lattice Locomoting Explorer (BILL-E).

FIG. 1 depicts an example Bipedal Isotropic Lattice Locomoting Explorer (BILL-E) 100 on a lattice structure 118 with its main components. Bill-E's main components are a foot 102, a foot servo motor with latch 104, a lower leg motor with gear 106, a lower leg with integral gear 108, a lower leg to upper leg bearing interface 110, an upper leg servo motor with rigid connection to lower leg 112, a hip motor and bearing interface 114, and a microcontroller 116.

FIGS. 2A-2B show a comparison of robotic assembly platforms for space structures. FIG. 2A depicts a gantry-based robotic arm assembly system 200, based on work from [W. R. Doggett, "Robotic Assembly of Truss Structures for Space Systems and Future Research Plans," in IEEE Aerospace Conference Proceedings, 2002]. As shown in FIG. 2A, robots can be mounted to linear gantries to increase the available build area for a given robot. FIG. 2B depicts a relative robotic system 250 enabling the construction of arbitrarily large structures built from discrete parts.

The structure Bill-E operates on is a Cuboct lattice, made of vertex connected octahedra. FIGS. 3A-3C depict the octahedra voxel geometry and 3D lattice structure. FIG. 3A0 shows a building block voxel 300. FIG. 3B shows a 3×3×3 cube of voxels 340. FIG. 3C shows an arbitrary macro geometry 380 made of voxels. As can be seen in FIG. 3B, several building block voxels 300 make up a 3×3×3 cube of voxels 340. As can be seen in FIG. 3C, several 3×3×3 cube of voxels 340 make up the arbitrary macro geometry 380 (which in this case is a hollow-face cube). The vertex connected octahedra 300 are referred to as voxels, or volumetric pixels, because they can be used to fill 3D space. The voxels used one embodiment of BILL-E have a lattice pitch 306 P=76.2 mm (3.0") and a strut length 308 L=P√2/2=53.88 mm (2.12"). The strut 304 has a square cross section with a side length 310~L/32=1.5 mm (0.056"). These building blocks 300 can be manufactured in a number of ways, such as being assembled from discrete struts 304 and nodes 302 [B. Jenett, D. Cellucci, C. Gregg, and K. C. Cheung, "Meso-scale digital materials: modular, reconfigurable, lattice-based structures," in Proceedings of the 2016

Manufacturing Science and Engineering Conference, 2016]. In this embodiment, they are injection molded. This allows for high performance materials, low manufacturing time, and high dimensional repeatability between parts. The parts are made from PEI (commercial name Ultem), a thermoplastic, and are reinforced with 20% chopped glass fiber. They are joined together using 0-80 screws and nuts. This allows them to be reversibly assembled, while also assuring sufficient load transfer and rigidity at the joints.

The robot is designed based on a set number of primitive maneuvers for locomotion to any point on a lattice structure. The design of the robotic platform developed from a set of functional requirements:

Robot must be able to traverse linearly (X)
Robot must be able to turn and traverse in the direction orthogonal to first direction (Y)
Robot must be able to turn up concave corners and down convex corners
Robot must be able to traverse in direction normal to plane described by first two directions (Z)
Robot must be able to step up/down a level (+/−Z)

Morphologically, the minimum required attachments to the structure is two. Bipedal robots, specifically those using an inchworm motion for movement are fairly ubiquitous [K. D. Kotay and D. L. Rus, "Navigating 3D steel web structures with an inchworm robot," Proc. IEEE/RSJ Int. Conf. Intell. Robot. Syst. IROS '96, vol. 1, pp. 368-375, 1996; S. M. Felton, M. T. Tolley, C. D. Onal, D. Rus, and R. J. Wood, "Robot self-assembly by folding: A printed inchworm robot," in Proceedings—IEEE International Conference on Robotics and Automation, 2013, pp. 277-282; C. Balaguer, A. Gimenez, J. M. Pastor, V. M. Padron, and M. Abderrahim, "A climbing autonomous robot for inspection applications in 3d complex environments," Robotica, vol. 18, no. 3, pp. 287-297, 2000], with more advanced design incorporating additional degrees of freedom to provide added functionality and directions of motion [R. L. Tummala, R. Mukherjee, N. Xi, D. Aslam, H. Dulimarta, J. Xiao, M. Minor, and G. Dangi, "Climbing the walls," IEEE Robot. Autom. Mag., vol. 9, no. 4, pp. 10-19, 2002]. The main difference between the robot described in the present invention and existing bipedal inchworm robots is that it is a relative robot operating within a 3D isotropic lattice. This enables it to perform much more complex maneuvers while also enabling interaction and manipulation with the structure that other robots, attaching with means such as suction cups, would be unable to achieve.

Figure 5C:
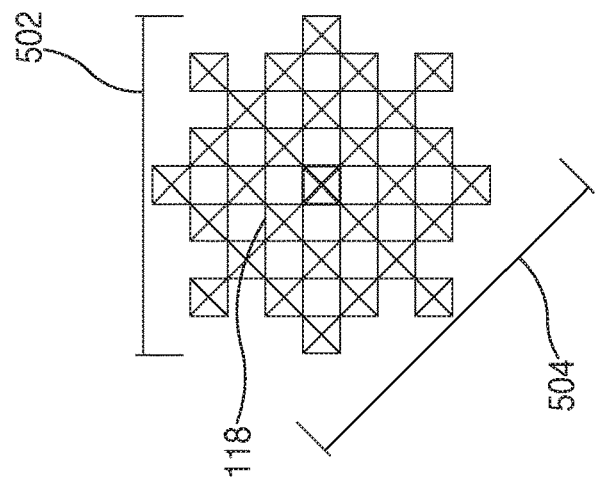
FIG. 5C is a top view of the resulting envelope of reach based on minimum dimensions meeting functional requirements.
Figure 5B:
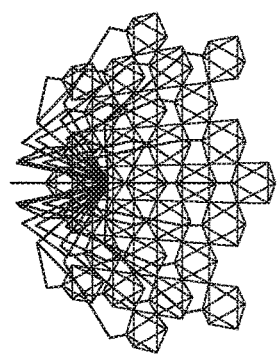
FIG. 5B is a ¾ view of the resulting envelope of reach based on minimum dimensions meeting functional requirements.
Figure 5A:
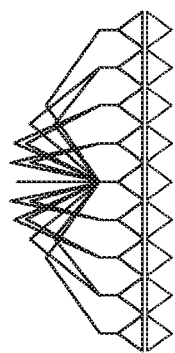
FIG. 5A is a side view of the resulting envelope of reach based on minimum dimensions meeting functional requirements.

FIG. 4A shows the primitive functional requirements for lattice locomotion. These include walking 402, stepping up 404, concave turn 406 and convex turn 408. FIG. 4B is a detail view of a convex corner turn 450. Based on the functional requirements, the approximate dimensions can be determined as a function of lattice pitch P 306. The convex corner turn 450 requires the longest reach, and thus the robot design is based on this maneuver. As shown in FIG. 4B, a first link (Link 1 454) has a value of ⅜L, and a second link (Link 2 456) has a value of 2.5×L. The maximum link length is found at the convex turn maneuver. Simpler maneuvers, such as linear steps, now can reach much further than a single inch-worm step, as shown in FIG. 4A. FIG. 5A is a side view of the resulting envelope of reach based on minimum dimensions meeting functional requirements. FIG. 5B is a ¾ view of the resulting envelope of reach based on minimum dimensions meeting functional requirements. FIG. 5C is a top view of the resulting envelope of reach based on minimum dimensions meeting functional requirements. In FIG. 5C, the lattice structure 118 spans nine times the strut length L 308 (see item 502), or 9(L), side to side in the X direction, and spans seven times the lattice pitch P 306, or 7P, in the X-Y direction (see item 504).

Figure 6:
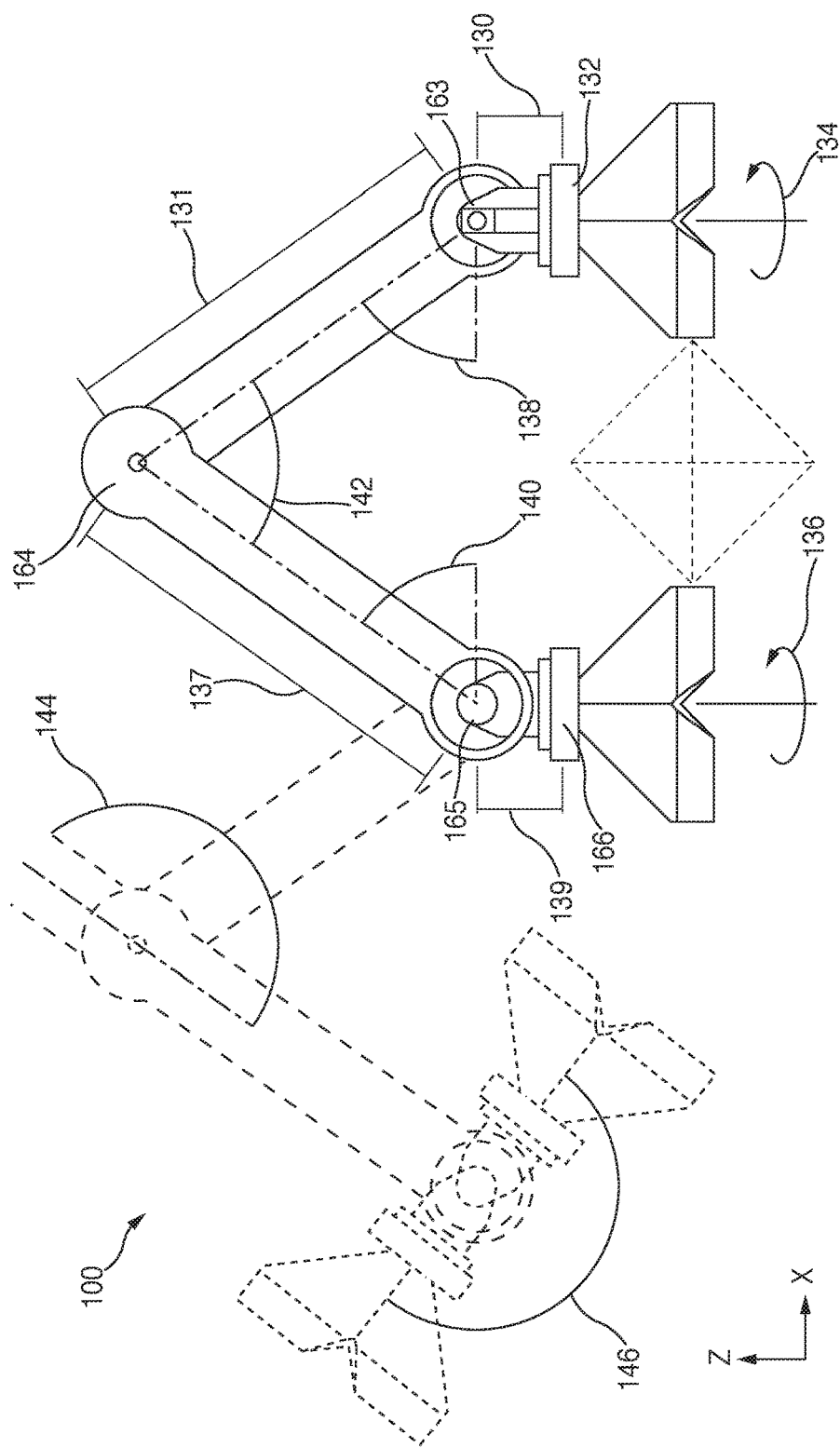
FIG. 6 is a schematic of the Bipedal Lattice Locomoting Explorer (BILL-E).

FIG. 6 is a schematic of the Bipedal Lattice Locomoting Explorer (BILL-E) 100. This schematic design results from the set of functional requirements. In FIG. 6, the robot is shown in neutral position. Shown in FIG. 6 are four links (130, 131, 137, 139) and five joints (132, 163, 164, 165, 166). As shown in the schematic, each foot is able to rotate 180 degrees about the vertical axis ($\Delta\lambda$ 136=180° and $\Delta\gamma$ 134=180°). The robot is able to rotate $\varphi$ 142=71° at joint 3 164, about links 2 131 and 3 137. The robot is able to rotate $\alpha$ 138=54.5° at joint 2 163, and $\beta$ 140=54.5° at joint 4 165 (both from the horizontal axis). $\Delta\varphi$ 144=180°, $\Delta\alpha$ 146=180° and $\Delta\beta$ 146=180°.

Figure 7:
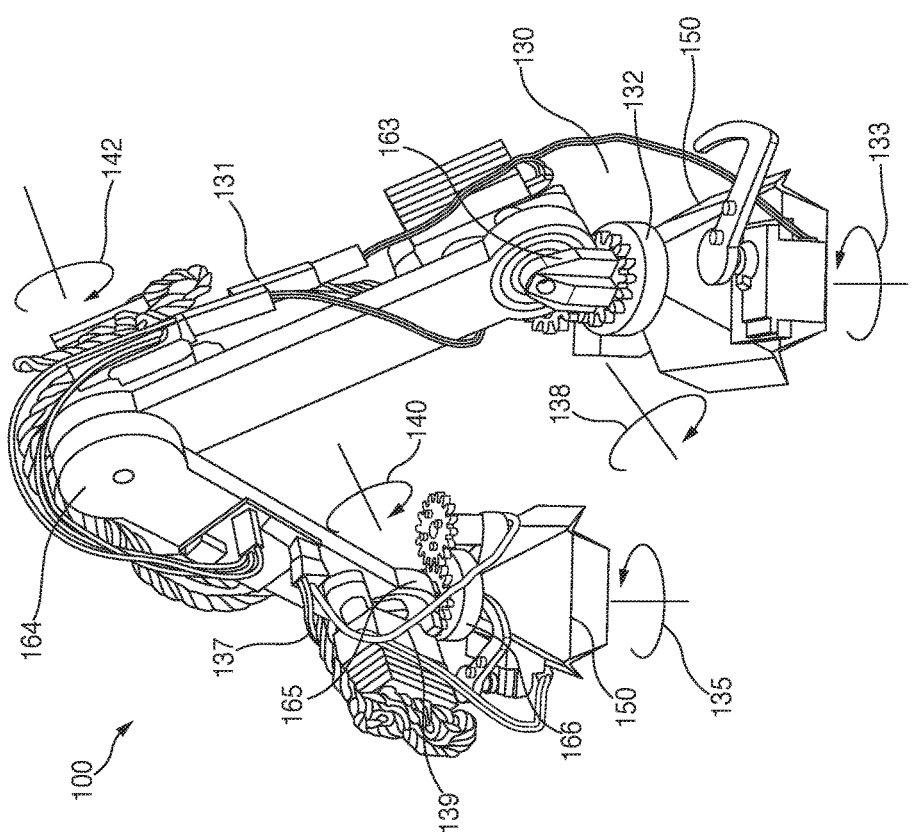
FIG. 7 is a photograph of a working prototype of the Bipedal Lattice Locomoting Explorer (BILL-E).

FIG. 7 is a photograph of a built working prototype of BILL-E, showing two latching grippers 150. FIG. 7 shows Link 1 130, Link 2 131, and Link 3 137. FIG. 7 also shows Joint 1 132, Joint 2 163, Joint 3 164, Joint 4 165, and Joint 5 166. Angle $\gamma$ 133 rotates about the vertical axis of one of the latching grippers 150. Angle $\lambda$ 135 rotates about the vertical axis of the other latching gripper 150. Angle $\alpha$ 138 is the degree to which Link 1 130 rotates with respect to Link 2 131 at Joint 2 163. Angle $\beta$ 140 is the degree to which Link 4 139 rotates with respect to Link 3 137 at Joint 4 165. Angle $\varphi$ 142 is the degree to which Link 3 137 rotates with respect to Link 2 at Joint 3 164.

Figure 8:
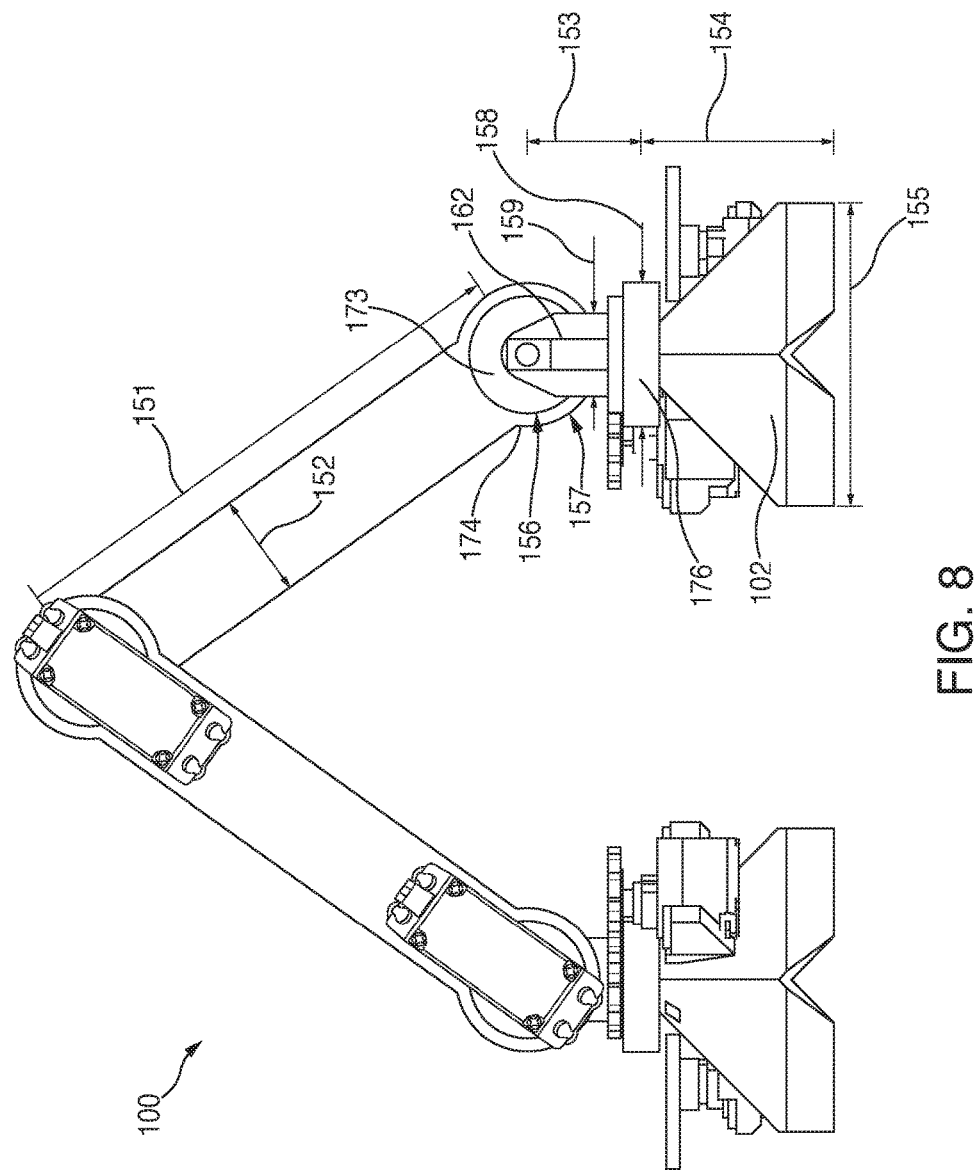
FIG. 8 shows another schematic of the Bipedal Lattice Locomoting Explorer (BILL-E).

FIG. 8 shows another schematic of the Bipedal Lattice Locomoting Explorer (BILL-E). The general dimensions of an example embodiment of BILL-E are specified in FIG. 8. The distance between Joint 2 163 and Joint 3 164 along Link 2 131 is 131.3 mm 151. Generally, the dimensions are the same for the opposite side of the robot (for example, the distance between Joint 4 165 and Joint 3 164 along Link 3 137 is also 131.3 mm). The width of Link 2 131 is 25.4 mm 152. The width of the foot 102 of the latching gripper 150 of the robot is 73.7 mm 155. The height of the foot 102 from the bottom to an ankle joint radial bearing 176 of Joint 2 163 is 46.6 mm 154. The height from the ankle joint radial bearing 176 to the middle of Joint 2 163 is 28.2 mm 153. Knee joint radial bearing 173 has a radius of 14.4 mm 156, and when combined with an upper leg link 174, the combined radius is 17.5 mm 157. The width of the ankle joint radial bearing 160 is 35.1 mm 158. Connecting Link 2 131 to Joint 2 163 is a hinge 162. The width of the hinge 162 is 20 mm 159.

FIGS. 7-8 demonstrate an inchworm design with a custom end effector. The specific components include a foot, lower leg, and upper leg. These components come together at actuated joints.

Table 1 shows the robot physical parameters and engineering specifications for one embodiment of the invention.

TABLE 1

ROBOT PHYSICAL PARAMETERS

| Parameter | Properties |
| --- | --- |
| Mass | 520 g |
| Small Servo Motor | Hitec HS-5065MG; m = 11 g, Torque@6 V = 2.2 kg * cm |
| Large Servo Motor | Hitec HS 7950TH; m = 68 g, Torque@6 V = 30 kg * cm |
| Bearings | Double Shielded Radial Ball Bearing; 12.77 mm (0.5") dia. ID, 28.575 mm (1.125") dia. OD |
| 3D Printed Parts | Feet, latch, gear, lower leg link, upper leg ink, servo horn hirth coupling |

BILL-E can have peripheral equipment. In one embodiment, the robot is powered with an external benchtop power supply able to provide roughly 10V and 30 A. The robot operates on 5V and pulls roughly 4 A during peak operation. The motors are controlled through a 12-channel servo controller board with a native USB interface and internal scripting control. BILL-E takes into account maintenance, reliability, and safety factors. While operating in 1G, there is a chance that the mechanical properties of the 3D printed parts will be insufficient over time. To solve this problem, the robot can be built from milled aluminum components.

Figure 10:
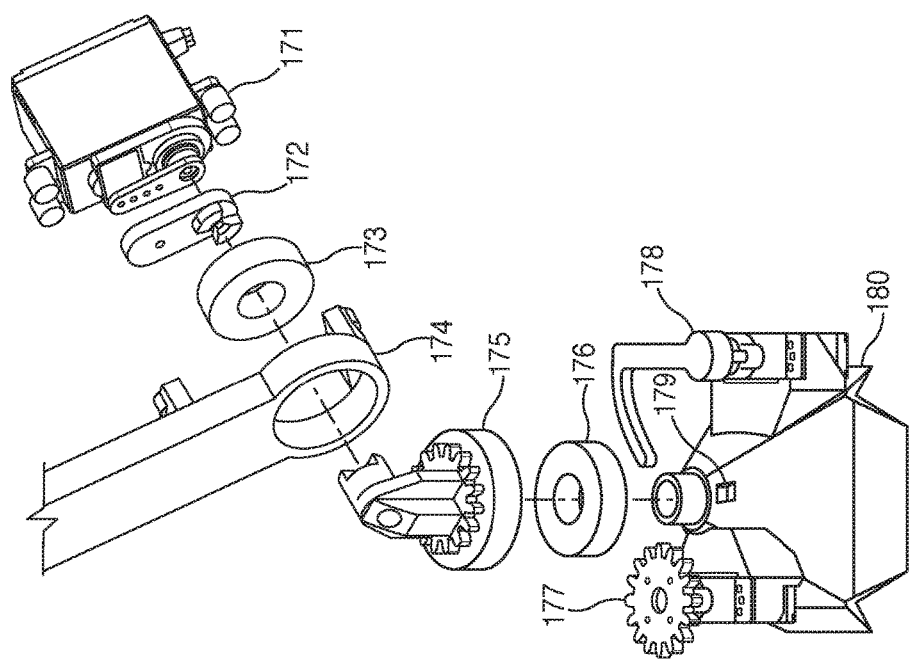
FIG. 10 is an exploded view of an example ankle joint of Bipedal Lattice Locomoting Explorer (BILL-E).

FIGS. 9A-9B show a description of a custom lattice gripping end effector 180 of a foot 102 of BILL-E 100. FIG. 9A shows a view of the foot geometry designed to fit around an octahedral voxel 300. A slot allows a latch mechanism to pass beneath the underside of the top corner of the voxel 300. FIG. 9B further shows how the foot corner features mate with node geometry of an octahedra voxel 300. FIG. 10 is an exploded view of an example ankle joint of BILL-E 100. The foot 102 is designed to fit around the outside of the top half of the octahedra 300 (FIGS. 9A-9B). It terminates in a cylindrical feature 182 whose outside diameter 184 is designed to press fit into an ankle bearing 176. The foot 102 has mating features which align with the four nodes 302 of the voxel 300. These contact points provide a rotational constraint in X, Y, and Z as well as a translational constraint in X, Y, and −Z. The +Z constraint is provided by a latching mechanism 178, which passes through a pair of holes in the foot 102 and underneath the top interior corner of the voxel 300, thereby constraining the foot 102 in +Z. The latch 178 is driven by a small servo motor mounted to the outside of the foot 102.

The foot 102 is press fit into the inside race of a radial bearing 176. The outside race is press fit into the lower leg link 175. This provides a rotational degree of freedom in the Z direction, while providing a translational constraint in X, Y, and Z, and a rotational constraint in X and Y. This rotation is actuated by a pair of spur gears. One gear is built into the lower leg, the other gear is mounted to a small servo. The top of the lower leg consists of a bracket and a shaft which is press-fit into the inside of a bearing. The outside of the bearing is press-fit into the end of the upper leg portion.

There are two types of upper legs. Each type has a similar interface with the lower leg. A servo motor is mounted so that its output spline radial axis is aligned with bearing interface with the lower leg. The lower leg shaft extends through the bearing and rigidly attaches to the servo spline. This allows a rotational degree of freedom between the upper and lower leg to be controlled by the servo (see FIGS. 9A, 9B, and 10). The upper legs interface at the "hip", where a similar rotational degree of freedom is used between the two upper legs. One leg has a shaft which press-fits into the inside of a bearing. The other leg press-fits around the outside of the bearing, and a servo is mounted to align with the bearing. The servo is rigidly attached to the shaft of the other leg which passes through the bearing. Shown in FIG. 10 is a knee joint actuator 171, servo horn hirth joint coupling 172, knee joint radial bearing 173, upper leg link 174, lower leg link with integral gear 175, ankle joint radial bearing 176, ankle joint mechanism+actuator 177, latch mechanism+actuator 178, latch mechanism slot 179, and foot end effector 180.

Analysis

Figure 11:
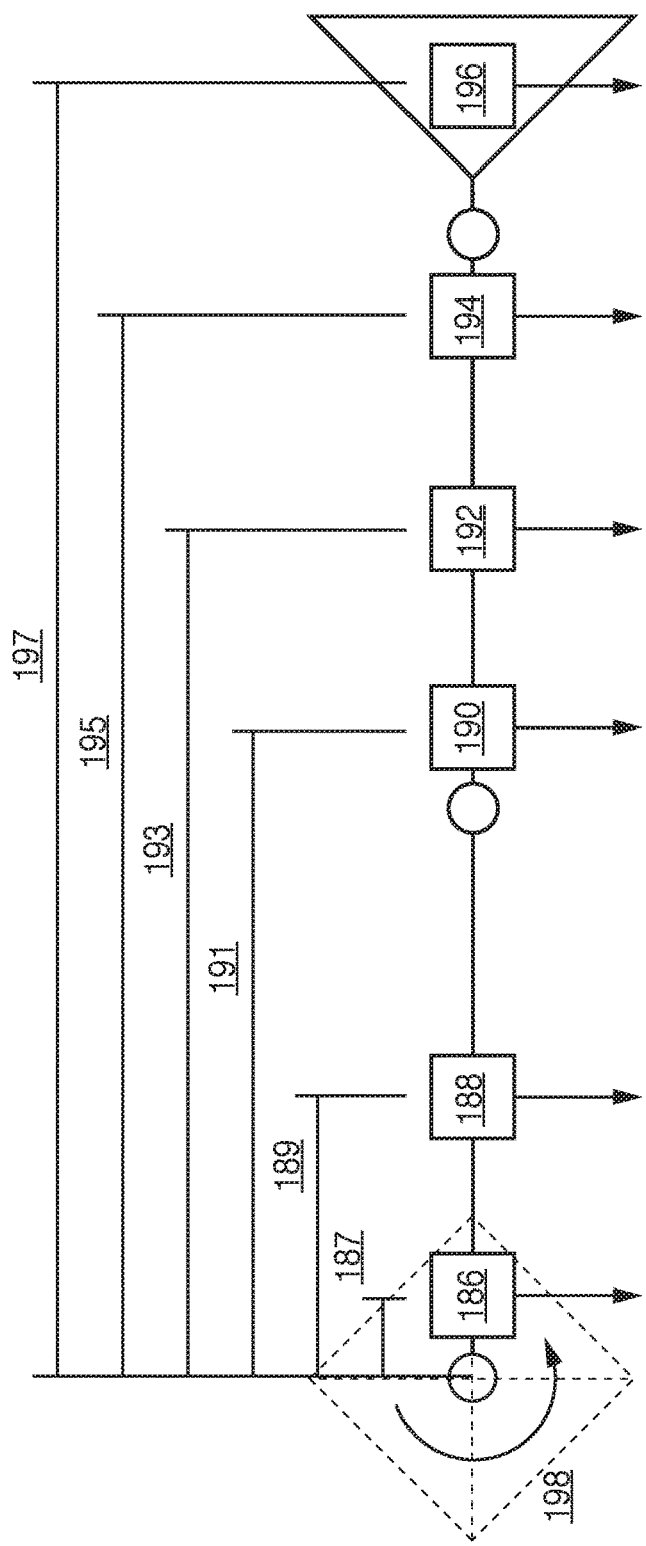
FIG. 11 is a free body diagram of robot mass under gravity loading in scenario generating greatest torque.

FIG. 11 provides an analysis of BILL-E's capabilities, and is a free body diagram of robot mass under gravity loading in scenario generating greatest torque. Masses are shown as summations of links or motor mass acting under gravity loading. While operating on earth, or in an environment with gravity, the mass of the motors becomes significant when performing certain maneuvers. It is possible to perform these maneuvers in ways to minimize the applied torque on the motor by the mass of the robot being actuated. The servo motors located at joints 1 and 5, which provide the latch and ankle rotation mechanism actuation, are primarily driven by geometric constraints-they have a small area in which they have to fit. However, this can create problems if the torque required by them during certain maneuvers in certain configurations is greater than their capacity. One such configuration is shown in FIG. 11. Here, the robot is extended fully, and will rotate about an axis perpendicular to the direction of gravity.

The masses and lengths are as follows: m1 186=90 g, m2 188=40 g, m3 190=90 g, m4 192=40 g, m5 194=90 g, and m6 196=70 g, L1 187=20 mm, L2 189=85 mm, L3 191=160 mm, L4 193=215 mm, L5 195=270 mm, L6 197=290 mm. The resulting torque 198 applied at the point of rotation is found by summing the torques created from each mass and its respective moment arm, as shown in Eq. 1:

$$\sum_{i=0}^{n} \tau = m_1 * L_1 + m_2 * L_2 + \ldots m_n * L_n \tag{1}$$

The total torque $\tau_{total}$ 198 is calculated to be 72800 g-mm, or 7.28 kg-cm. As shown in Table 1, the servos used for this actuation are rated to 2.2 kg-cm. Therefore, in this worst case scenario, the servo would be unable to rotate the robot as configured. However, as shown in the experiments, it is possible to align the robot with the axis of rotation, thus minimizing the moment arm for all of the robot mass to be rotated. This allows the motor to sufficiently rotate the robot. For space applications, the mass of the robot must be reduced to its minimum required to perform its tasks. This will require optimization of motor mass relative to torque capacity and required torque for maneuvering. Another consideration is using the torque generated by this rotation as a useful force during space operations, such as attitude control.

Experimentation

Figure 12D:
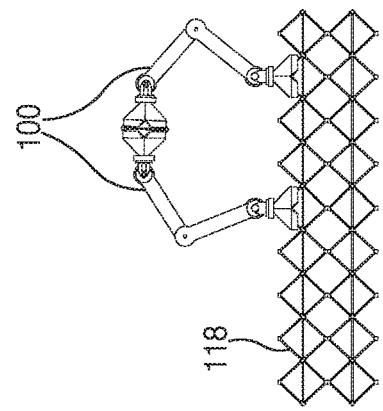
FIG. 12D shows the Bipedal Lattice Locomoting Explorer (BILL-E) performing a coordinated part transportation maneuver.
Figure 12C:
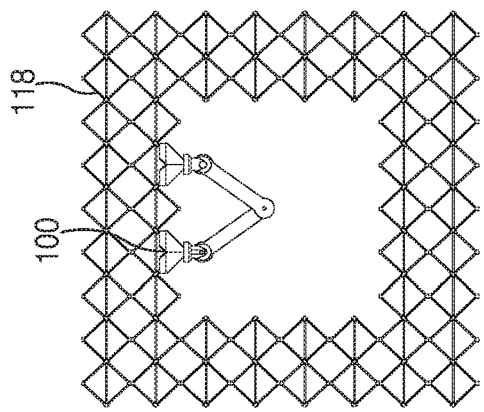
FIG. 12C shows the Bipedal Lattice Locomoting Explorer (BILL-E) performing an inverted locomotion maneuver.
Figure 12B:
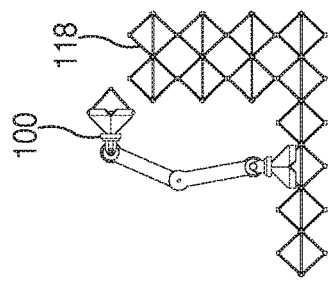
FIG. 12B shows the Bipedal Lattice Locomoting Explorer (BILL-E) performing a part placement maneuver.
Figure 12A:
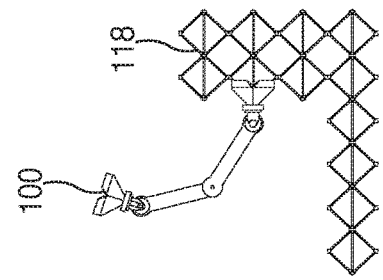
FIG. 12A shows the Bipedal Lattice Locomoting Explorer (BILL-E) performing a climbing maneuver.

In order to assess the validity of the robot design, numerous experiments were performed. These experiments are divided into basic and advanced maneuvers. Basic maneuvers include locomotion in X while oriented in +Z, climbing a vertical surface (+Z) using both step by step locomotion and ankle rotation, and part placement. Advanced maneuvers include locomotion in X while oriented in −Z, with several ankle rotations to climb to and from a +Z orientation, and the use of two robots to pass a part from one robot to the other. This last experiment suggests the ability to transport parts arbitrary distances by using a chain of passing and locomotion maneuvers. Screenshots from these experiments are shown in FIGS. 12A-12D. FIG. 12A shows the Bipedal Lattice Locomoting Explorer (BILL-E) performing a climbing maneuver. FIG. 12B shows the Bipedal Lattice Locomoting Explorer (BILL-E) performing a part placement maneuver. FIG. 12C shows the Bipedal Lattice Locomoting Explorer (BILL-E) performing an inverted locomotion maneuver. FIG. 12D shows two different Bipedal Lattice Locomoting Explorers (BILL-Es) performing a coordinated part transportation maneuver. The full sequence of these experiments and functional operation is shown in FIGS. 13-17, and video was taken.

Figure 13:
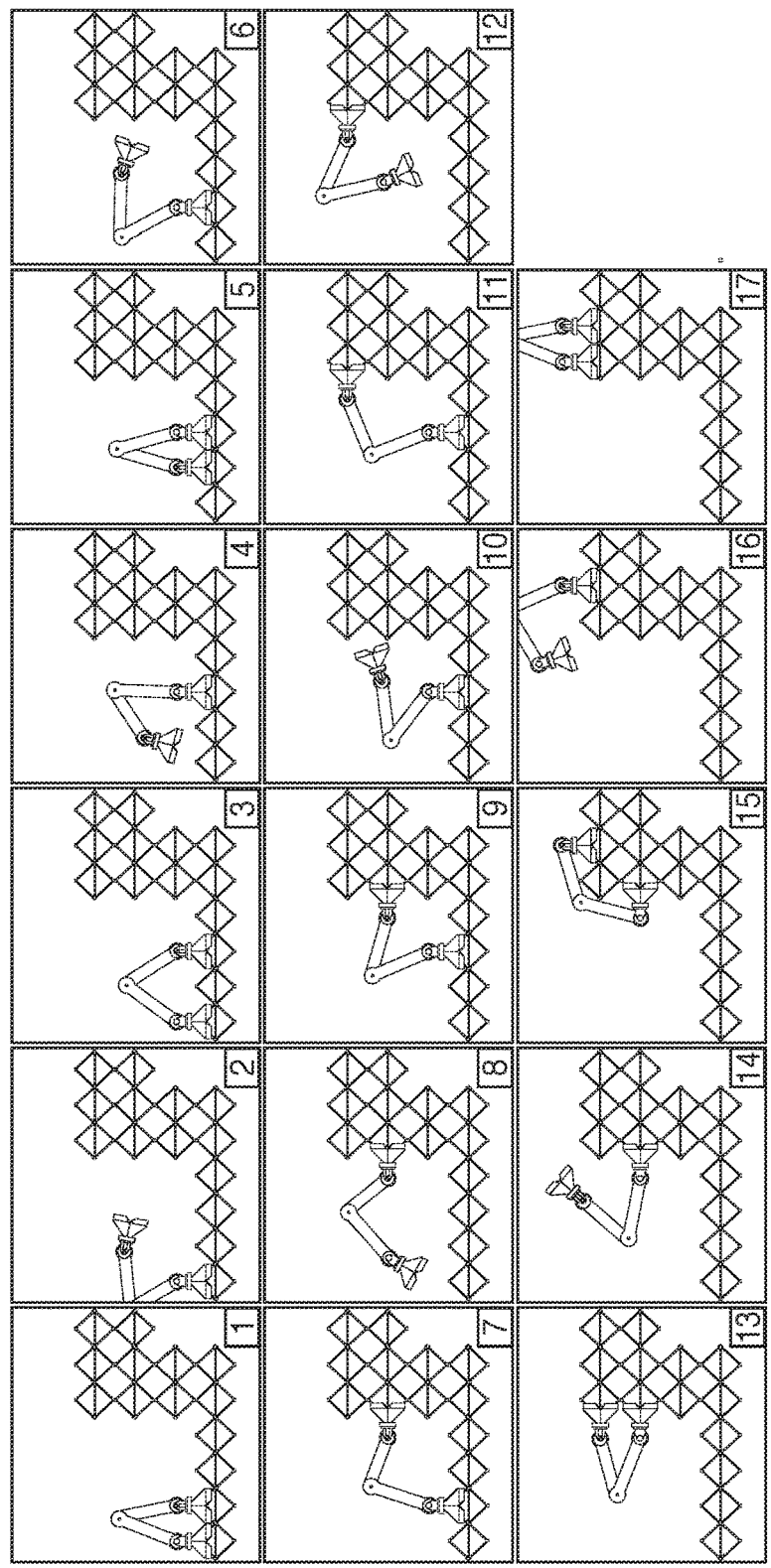
FIG. 13 shows a demonstration of climbing by taking single steps with convex and concave corner maneuvering.
Figure 14:
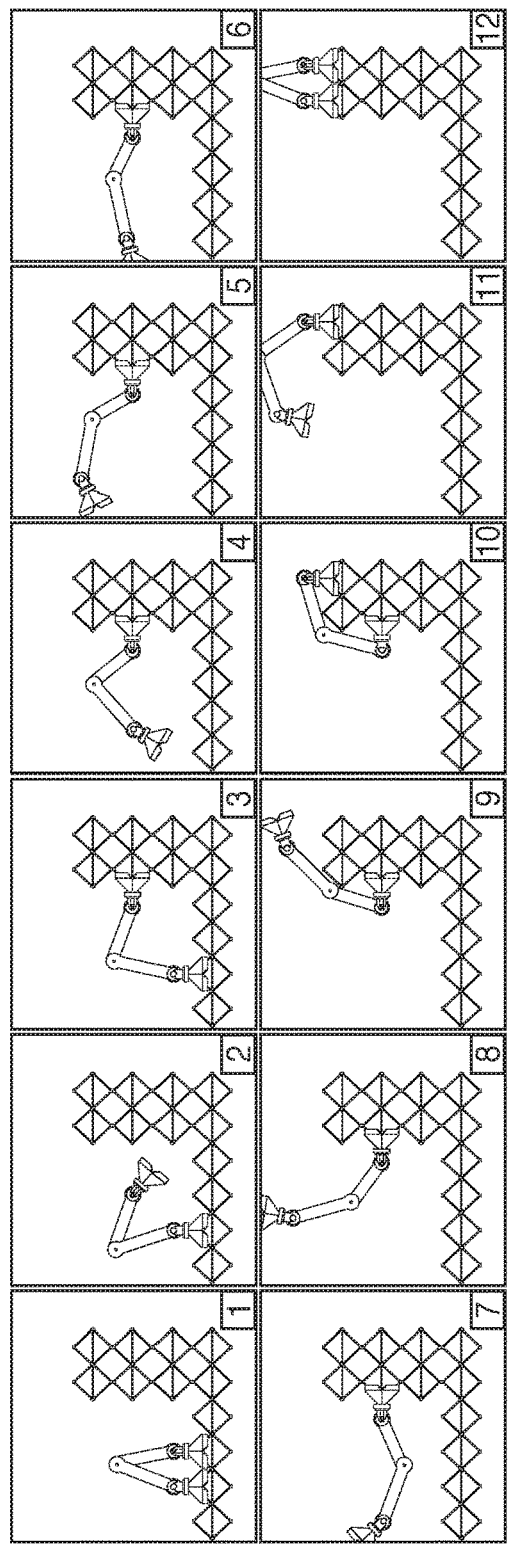
FIG. 14 shows a demonstration of climbing via rotation about ankle joint.
Figure 15:
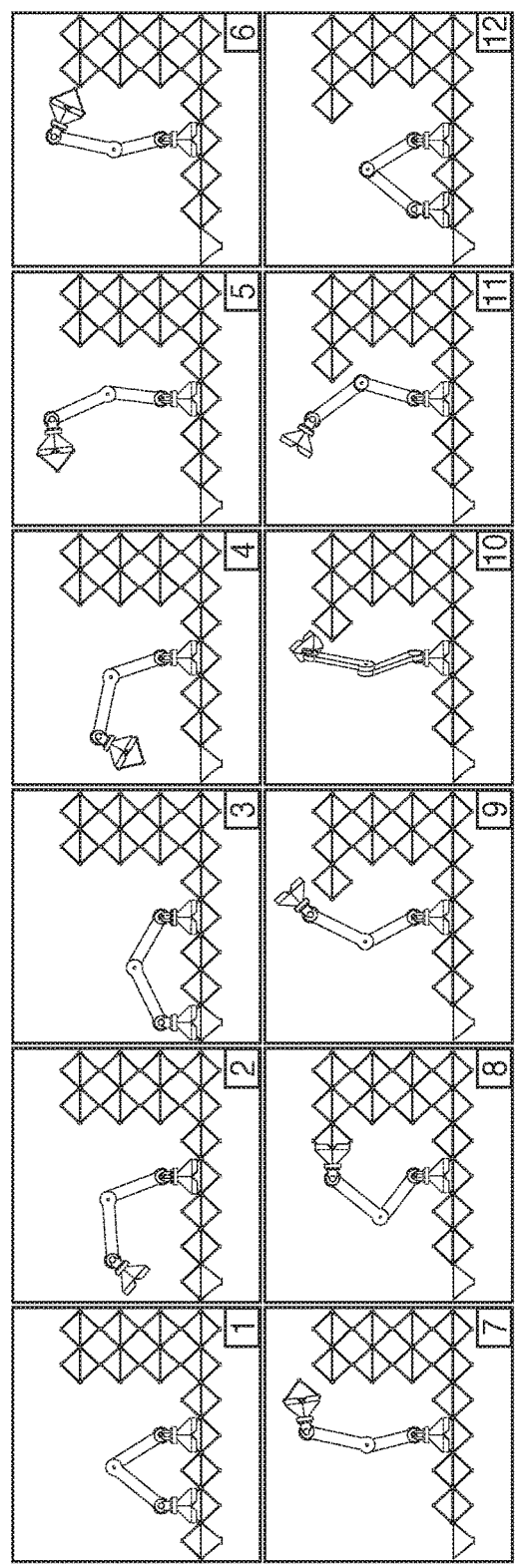
FIG. 15 shows a demonstration of part manipulation.

FIGS. 13-17 are screenshots from video footage taken of benchtop experiments using a working embodiment. The parts shown in FIGS. 13-15 are made from Nanotool, a 3D printer photopolymer.

FIG. 13 shows a demonstration of climbing by taking single steps with convex and concave corner maneuvering. In steps 1-5, the robot takes single steps forward. In steps 6-11, it approaches the concave corner by stepping up on the vertical face of the structure. In steps 12-13, it steps entirely onto the vertical face of the structure. In steps 14-15, it steps around the convex corner of the structure onto the top of the structure. In steps 16-17, it completes the sequence by stepping all the way onto the top of the structure. Total elapsed time: 5 min.

FIG. 14 shows a demonstration of climbing via rotation about ankle joint. In steps 1-3, the robot reaches out and grips the vertical face of the structure. In steps 4-7, it rotates 180° about its ankle joint. In steps 8-10, it swings up to place its foot atop the structure. In steps 11-12, it completes the sequence by stepping onto the top of the structure. Total elapsed time: 2 min.

FIG. 15 shows a demonstration of part manipulation. In steps 1-4, the robot grabs the part. In steps 5-7, the robot rotates about its ankle joint 180° to face the desired location for part placement. In steps 8-9, it places the part and releases its gripper. In steps 10-12, the robot rotates back to its original position. Total elapsed time: 1.5 min.

Figure 16:
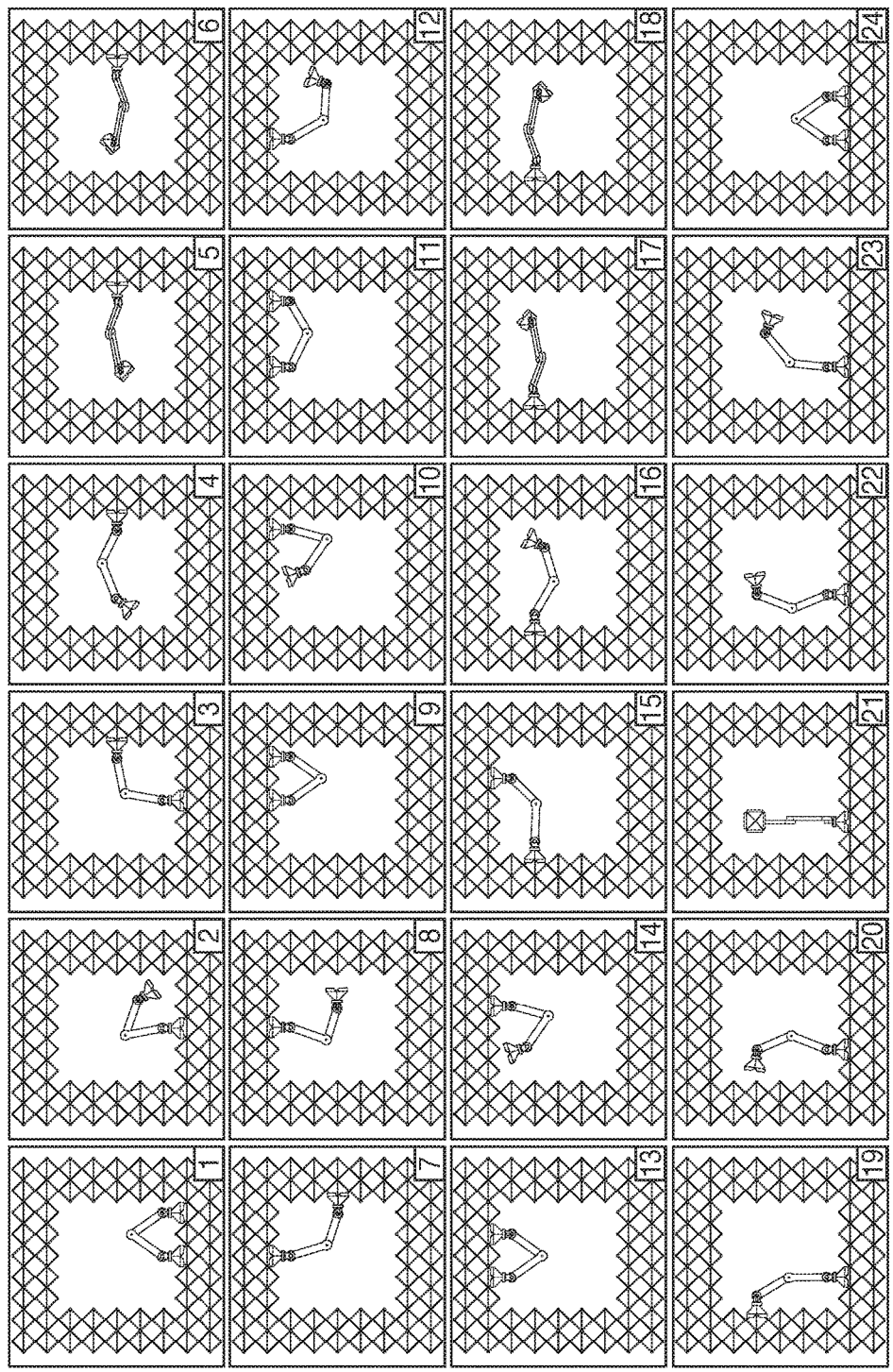
FIG. 16 shows a demonstration of climbing 360° around a loop using ankle rotation and upside down locomotion.

FIG. 16 shows a demonstration of climbing 360° around a loop using ankle rotation and upside down locomotion. In steps 1-7, the robot uses ankle rotation to climb to the upper surface of the structure. In steps 8-13, the robot steps along the upper surface of the structure while hanging upside down. In steps 14-24, the robot uses two ankle rotation maneuvers to step to the side of the structure and then to return to its original position. Total elapsed time: 10 min.

Figure 17:
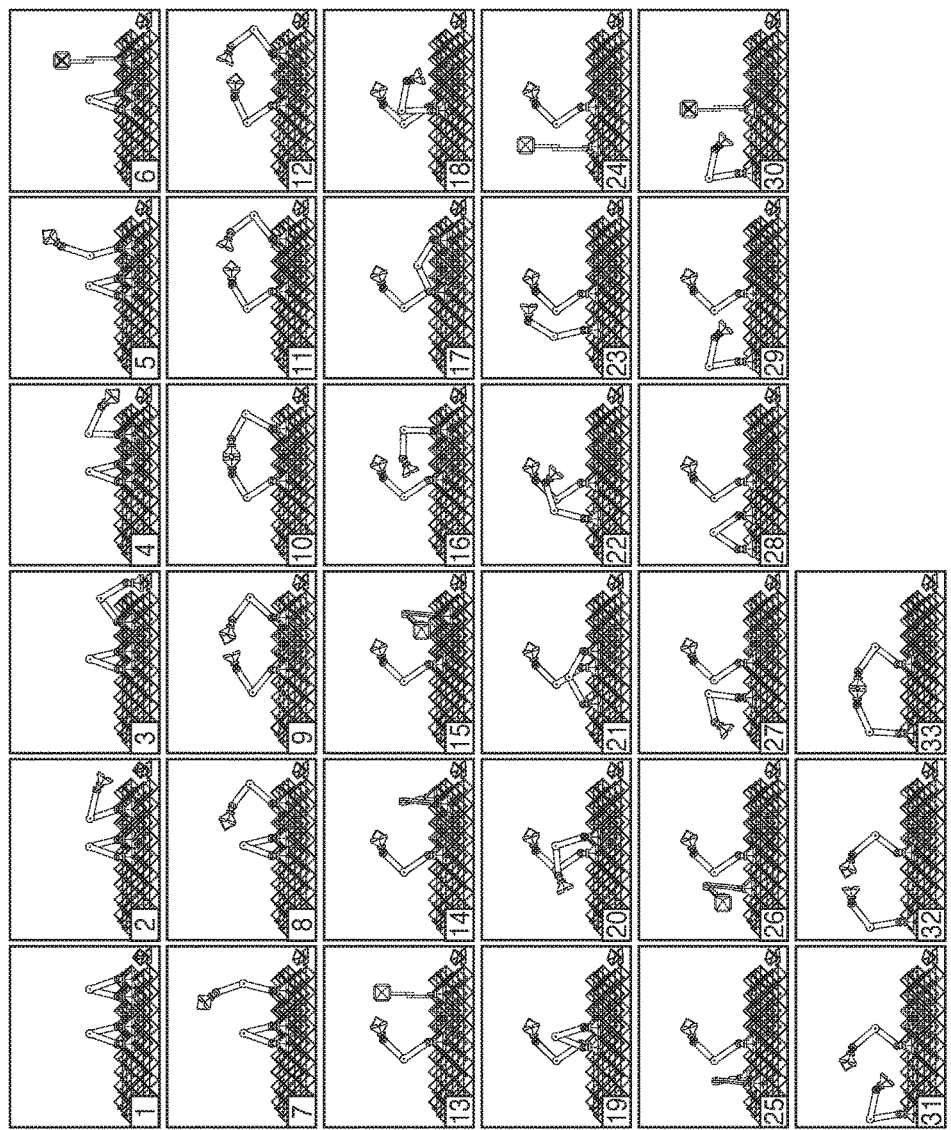
FIG. 17 shows a demonstration of two robots transporting material.

FIG. 17 shows a demonstration of two robots transporting material. In steps 1-9, robot 1 grabs and positions the part to be transferred to robot 2. In steps 10-11, the part is handed off from robot 1 to robot 2. In steps 12-29, robot 1 walks around to the other side of robot 2 and positions itself to receive the part. In steps 30-32, robot 2 rotates to hand off the part to robot 1. In step 33, the robots are handing the part off. Total elapsed time: 10 min.

Alternate embodiments and designs of the invention and associated software could include additional features on the foot end effectors to allow bolting of new parts onto existing structure, thereby allowing robotic assembly of arbitrarily large structures. Supportive theory includes algorithms for group/swarm/emergent behavior of numbers of robots working in a coordinated fashion, which can be evaluated for efficiency in building large structures with multiple robots.

CONCLUSION

The Bipedal Lattice Locomoting Explorer (BILL-E) has numerous application in space. One is as it applies to structures—their construction, repair, and inspection. Several possible space structures made from discrete lattice elements include: booms/masts, pressure vessels, plates/shelters, and structure for precision instruments such as reflector dishes. The construction of hierarchical trusses can be much more structurally efficient [T. Murphey and J. Hinkle, "Some performance trends in hierarchical truss structures," in 44th AIAA/ASME/ASCE/AHS Structures, Structural Dynamics, and Materials Conference, 2003], and the Bipedal Lattice Locomoting Explorer (BILL-E) could be used to assist in constructing these trusses made of trusses.

Figure 18C:
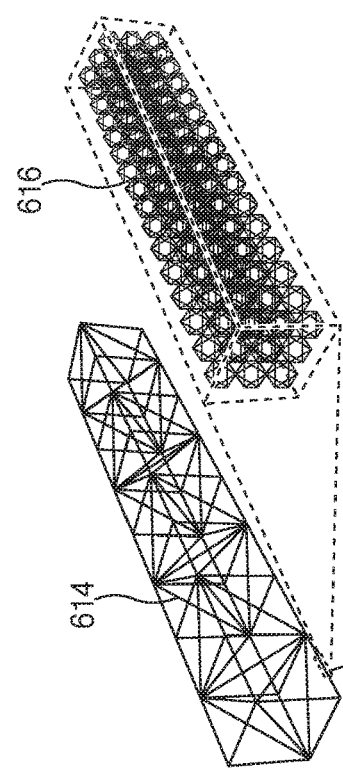
FIG. 18C shows an example truss hierarchical structure.
Figure 18B:
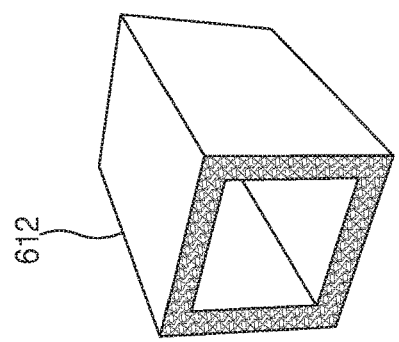
FIG. 18B shows an example habitat made from discrete lattice elements.
Figure 18A:
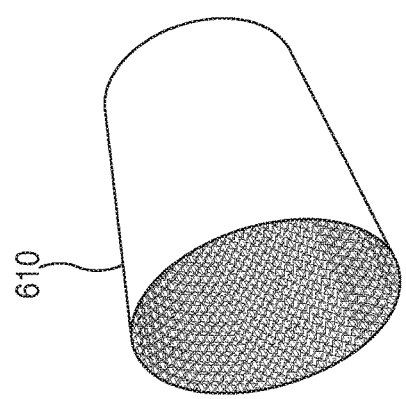
FIG. 18A shows an example pressure vessel made from discrete lattice elements.

FIGS. 18A-18C show different space applications for Bipedal Lattice Locomoting Explorer (BILL-E) structures. FIG. 18A shows an example pressure vessel 610 made from discrete lattice elements. FIG. 18B shows an example habitat 612 made from discrete lattice elements. FIG. 18C shows a an example truss hierarchical structure 614, where truss structure 614 is made up of several truss structures 616. For the pressure vessel 610 and habitat 612 (FIGS. 18A and 18B), skinning the structure would also be done by a relative robot to be designed in further inventions. For the example truss hierarchical structure 614 (FIG. 18C), special lattice parts may be required for interfacing between diagonal macro-struts.

The second application is using BILL-E as a mobile and reconfigurable source of actuation throughout these larger structures. In this case, BILL-E could provide a number of services such as active damping, attitude control, and macro scale actuation for on-orbit operations. FIG. 19A shows active damping of a plate structure 710. As an active damper, a number of robots 100 could be distributed throughout a structure 710, based on the modal analysis of the structure and the desired damping. As shown in FIG. 19A, a plate 710 could contain damping joints in which robots 100 would be placed for controlling the behavior of the overall structure 710. FIG. 19B shows attitude control for a satellite 714. As a method for attitude control, the rotational ability of BILL-E can be compared to that of a reaction wheel. In order to maintain the orientation of a satellite while in orbit, reaction wheels are used to offset the tendency for the satellite to realign itself with the body it is orbiting. Reaction wheels become saturated, and normally need propulsion to de-saturate them for reuse. BILL-E robots serve as a secondary system that allows fuel to be conserved, or to possibly replace reaction wheels entirely. FIG. 19C shows actuation of a macro structure 716. Large scale robotic platforms such as cranes and arms are constructed using links made of lattice structure 716 and using one or more robots 100 as the joint. This enables modular, reconfigurable, macro-scale robots to be built, used, and disassembled on orbit for a number of purposes.

The Bipedal Isotropic Lattice Locomoting Explorer (BILL-E) is also capable of joining of voxels. Automated bolting is an existing technology. Joining of voxels involves adapting an end effector for BILL-E to grab, place, and bolt a voxel in place. Different control and optimization for build strategies exist for this purpose. Coordination of multiple robots requires algorithms for autonomous building. From a hardware perspective, autonomy is assisted by wireless communication and battery power. The robot can also be solar powered, or be rechargeable by replacing battery packs, which can be addressed by a secondary system which can replace power and material (new voxels) as needed.

The main novel and unique feature of the robot is its end effector. The end effector is custom designed to interface specifically with the lattice upon which the robot operates, and combined with several motor-driven mechanisms, sufficiently restrains the 6 degrees of freedom at each foot. Four of these degrees are passively restrained, and two are actively restrained. This is an example of how the periodic lattice structure is leveraged for simplification of the robot design.

There are several advantages of the invention and accompanying software. The robot design offers robust dexterity and variety of maneuvering capabilities while maintaining sufficiently low numbers of actuators which allow for simplified control strategies. The robot can also cooperate with other robots to achieve material transportation. This approach, using multiple robots operating in parallel, can be used to achieve high frequency operations when considered as one massive array of robots.

The invention addresses development and new conceptual problems. As mentioned, new developments are an end effector which can bolt new parts onto the existing structure. This has been developed as a new appendage, thereby allowing the robot to locomote while holding a part, bring it to the build location, and assemble the new structure in place.

Test data has been gathered, and source of error analyzed. The robot is controlled via position control. This can be "key-framed" whereby each step or maneuver is a pre-programmed set of positions. The sequences given in FIG. 13-17 are not optimized for speed, but rather for successful maneuver execution. Error can be attributed to robot self weight and deflection, as well as applied loads and resulting deflection of adjacent structure, that can result in small errors of pre-programmed end effector positions. This can be addressed with optimization and/or operation in 0 g.

This invention is a substantial advancement in the art. Depending on its application, there are several potential commercial applications using this robotic platform. It could be used to construct large solar arrays in space to harness vast amounts of solar energy for use in space or on earth. The structures built by the robot also have potential application in aerospace. Ultralight stiff structures can be used as components on airplanes, spacecraft, and satellites. This invention is also applicable to ongoing research at NASA.

While the above specification and examples provide a description of the invention, many embodiments of the invention can be made without departing from the spirit and scope of the invention. It is to be understood that the foregoing embodiments are provided as illustrative only, and does not limit or define the scope of the invention. Various other embodiments are also within the scope of the claims.

What is claimed is:

1. A robot capable of traversing a three-dimensional lattice structure, comprising:
    two feet, each foot being a hollow polyhedron designed to fit around a boundary geometry of a volumetric pixel structure;
    two lower legs, each joined to one of the two feet at an ankle joint, and to an upper leg at a knee joint, the two upper legs coming together at a hip interface; and
    a plurality of motors to actuate the robot.

2. The robot of claim 1, wherein the polyhedron is a tetrahedron.

3. The robot of claim 1, further comprising a motor at each foot, at each of lower leg, at each knee joint, and at the hip interface.

4. The robot of claim 1, wherein each foot comprises a latch mechanism driven by a servo motor to lock the foot onto the volumetric pixel structure.

5. The robot of claim 4, wherein the latch passes through a hole near the top of the polyhedron, and is configured to pass under the top of the volumetric pixel structure and out the other side of the volumetric pixel structure, preventing the foot from lifting.

6. The robot of claim 1, wherein each of the feet is attached to a lower leg by a radial bearing, each of the feet being press fit to an inside race of the radial bearing, the attached lower leg being press fit around the outside onto the outer race of the bearing.

7. The robot of claim 1, further comprising a microcontroller to issue commands to actuate the robot.

8. The robot of claim 1, wherein each of the motors is powered by a battery.

9. The robot of claim 1, further comprising a pair of spur gears for each foot and lower leg connection to actuate rotation of the foot, one gear being built into the lower leg, the other gear being mounted to a servo motor.

10. The robot of claim 1, wherein a top of each lower leg comprises a bracket and a shaft which is press-fit into the inside of a bearing, the outside of the bearing being press-fit into an end of an upper leg.

11. The robot of claim 1, wherein a servo motor is mounted on each of the upper legs, so that an output spline radial axis of the servo motor is aligned with a bearing interface of a lower leg to which the upper leg is connected, a shaft of the lower leg extending through the bearing and attaching to the servo spline.

12. The robot of claim 11, wherein the servo controls a rotational degree of freedom between the upper and lower leg.

13. The robot of claim 1, wherein the hip interface comprises:
    a first upper leg having a shaft which press-fits into the inside of a bearing,
    a servo motor attached to the shaft; and
    a second upper leg press-fit around the outside of the bearing.

14. The robot of claim 13, wherein the servo motor is rigidly attached to the shaft of the second upper leg.

15. The robot of claim 1, wherein maneuvers the robot is capable of performing on the lattice structure comprise one or more of:
    climbing, or walking up or down vertically on the lattice perpendicular to the ground;
    inverted locomotion, or walking on the underside of surfaces parallel to the ground;
    rotating 90 degrees to move from X to Y translation;
    turning inside or outside corners to transition from one surface to a perpendicular surface;
    gripping with one foot and using the other foot to grip a single voxel;
    part placement, or extending to place a gripped voxel in a different area of the lattice; and
    coordinated part transportation, or attaching a gripped voxel to different area of the lattice.

16. The robot of claim 1, wherein maneuvers the robot is capable of performing on the lattice structure comprise one or more of:
    traversing linearly (X);
    turning and traversing in the direction orthogonal to first direction (Y);
    turning up concave corners and down convex corners;
    traversing in direction normal to plan described by first two directions (Z); and
    stepping up/down a level (+/−Z).

17. The robot of claim 1, wherein the foot terminates in a cylindrical feature with an outside diameter designed to press fit into an ankle bearing.

18. The robot of claim 1, wherein the foot has mating features which align with four nodes of a volumetric pixel, to provide rotational and translational constraint.

19. The robot of claim 1, wherein each of the ankle joints comprises:
    a knee joint actuator;
    a servo horn hirth joint coupling;
    a knee joint radial bearing;
    an upper leg link;
    a lower leg link with integral gear;

an ankle joint radial bearing;
an ankle joint mechanism and actuator;
a latch mechanism and actuator;
a latch mechanism slot; and
a foot end effector.

20. A method of traversing an exterior of a three-dimensional lattice structure by a robot that comprises two feet, comprising:
attaching a back foot to a voxel;
reaching out with the front foot;
attaching the front foot to a different voxel;
detaching the back foot; and
stepping forward with the back foot.

21. The method of claim 20, further comprising after attaching the front foot, the step of rotating 180 degrees about the front foot, extending the back foot and attaching.

* * * * *